US011135811B2

(12) United States Patent
Iwamoto et al.

(10) Patent No.: US 11,135,811 B2
(45) Date of Patent: Oct. 5, 2021

(54) INTERLAYER FOR LAMINATED GLASS, AND LAMINATED GLASS

(71) Applicant: SEKISUI CHEMICAL CO., LTD., Osaka (JP)

(72) Inventors: Tatsuya Iwamoto, Shiga (JP); Nami Minakuchi, Shiga (JP); Yuuma Takeda, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 113 days.

(21) Appl. No.: 15/455,444

(22) Filed: Mar. 10, 2017

(65) Prior Publication Data

US 2017/0182748 A1 Jun. 29, 2017

Related U.S. Application Data

(63) Continuation of application No. PCT/JP2015/075933, filed on Sep. 11, 2015, and a continuation of application No. PCT/JP2015/075937, filed on Sep. 11, 2015, and a continuation of application No. PCT/JP2015/075934, filed on Sep. 11, 2015, and a continuation of application No. PCT/JP2015/075936, filed on Sep. 11, 2015, and a continuation of application No. PCT/JP2015/075935, filed on Sep. 11, 2015, and a continuation of application No. PCT/JP2015/075932, filed on Sep. 11, 2015, and a continuation of application No. PCT/JP2015/075938, filed on Sep. 11, 2015.

(30) Foreign Application Priority Data

Sep. 12, 2014 (JP) .............................. JP2014-187077
Sep. 12, 2014 (JP) .............................. JP2014-187078
Sep. 12, 2014 (JP) .............................. JP2014-187079
Sep. 12, 2014 (JP) .............................. JP2014-187080
Sep. 12, 2014 (JP) .............................. JP2014-187081
Sep. 12, 2014 (JP) .............................. JP2014-187082
Sep. 12, 2014 (JP) .............................. JP2014-187083

(51) Int. Cl.
*B32B 17/10* (2006.01)
*B32B 7/022* (2019.01)
*B32B 7/027* (2019.01)
*B32B 7/02* (2019.01)
*C03C 27/00* (2006.01)
*B32B 27/08* (2006.01)
*B32B 27/20* (2006.01)
*B32B 27/30* (2006.01)

(52) U.S. Cl.
CPC .......... *B32B 17/10761* (2013.01); *B32B 7/02* (2013.01); *B32B 7/022* (2019.01); *B32B 7/027* (2019.01); *B32B 17/10027* (2013.01); *B32B 17/10036* (2013.01); *B32B 17/10082* (2013.01); *B32B 17/10605* (2013.01); *B32B 17/10614* (2013.01); *B32B 17/10688* (2013.01); *B32B 17/10935* (2013.01); *B32B 27/08* (2013.01); *B32B 27/20* (2013.01); *B32B 27/30* (2013.01); *C03C 27/00* (2013.01); *B32B 2264/102* (2013.01); *B32B 2307/102* (2013.01); *B32B 2307/412* (2013.01); *B32B 2307/546* (2013.01); *B32B 2419/00* (2013.01); *B32B 2605/00* (2013.01); *B32B 2605/006* (2013.01)

(58) Field of Classification Search
CPC ........ B32B 17/10761; B32B 17/10935; B32B 17/10082; B32B 17/10605; B32B 17/10614; B32B 17/10688; B32B 17/10027; B32B 17/10036; B32B 27/08; B32B 27/20; B32B 27/30; B32B 2605/00; B32B 2307/102; B32B 2419/00; B32B 2605/006; B32B 2307/546; B32B 2307/412; B32B 2264/102; C03C 27/00
See application file for complete search history.

(56) References Cited

U.S. PATENT DOCUMENTS

| | | | |
|---|---|---|---|
| 4,681,810 A | 7/1987 | Gomez | |
| 5,449,560 A | 9/1995 | Antheunis et al. | |
| 8,039,112 B2 * | 10/2011 | Keller | C08K 3/36 428/436 |
| 2004/0160688 A1 | 8/2004 | Noguchi et al. | |
| 2005/0233547 A1 | 10/2005 | Noda et al. | |
| 2006/0210782 A1 * | 9/2006 | Lu | B32B 27/08 428/212 |

(Continued)

FOREIGN PATENT DOCUMENTS

| | | |
|---|---|---|
| CN | 101124176 A | 2/2008 |
| CN | 101460303 A | 6/2009 |

(Continued)

OTHER PUBLICATIONS

International Search Report issued in International Application No. PCT/JP2015/075932; dated Dec. 1, 2015 (2 pages).
International Search Report issued in International Application No. PCT/JP2015/075933; dated Dec. 1, 2015 (2 pages).
International Search Report issued in International Application No. PCT/JP2015/075934; dated Dec. 1, 2015 (2 pages).
International Search Report issued in International Application No. PCT/JP2015/075935; dated Dec. 1, 2015 (2 pages).
International Search Report issued in International Application No. PCT/JP2015/075936; dated Dec. 1, 2015 (2 pages).

(Continued)

*Primary Examiner* — Cheng Yuan Huang
(74) *Attorney, Agent, or Firm* — Osha Bergman Watanabe & Burton LLP

(57) ABSTRACT

An interlayer film for laminated glass having a one-layer structure or a two or more-layer structure includes a first layer containing a polyvinyl acetal resin and a plasticizer, wherein the first layer further contains silica particles, and the ratio of a content of the silica particles in the first layer to a total content of the polyvinyl acetal resin and the plasticizer in the first layer is from 0.03 to 0.4.

15 Claims, 2 Drawing Sheets

(56) References Cited

U.S. PATENT DOCUMENTS

| | | | |
|---|---|---|---|
| 2007/0231584 A1 | 10/2007 | Hasegawa | |
| 2007/0287786 A1* | 12/2007 | Yuan | B32B 17/10761 524/492 |
| 2008/0124540 A1 | 5/2008 | Yuan | |
| 2008/0268270 A1 | 10/2008 | Chen et al. | |
| 2009/0311497 A1* | 12/2009 | Aoki | B32B 17/10366 428/214 |
| 2010/0028642 A1 | 2/2010 | Steuer et al. | |
| 2010/0124647 A1 | 5/2010 | Keller et al. | |
| 2010/0208349 A1 | 8/2010 | Beer et al. | |
| 2011/0186042 A1 | 8/2011 | Keller et al. | |
| 2011/0287265 A1 | 11/2011 | Hasegawa | |
| 2012/0162752 A1 | 6/2012 | Kitano et al. | |
| 2012/0244329 A1 | 9/2012 | Iwamoto et al. | |
| 2012/0244364 A1 | 9/2012 | Iwamoto et al. | |
| 2012/0328843 A1 | 12/2012 | Cleary et al. | |
| 2013/0183507 A1 | 7/2013 | Matsuda et al. | |
| 2013/0183532 A1 | 7/2013 | Shimamoto et al. | |
| 2013/0189528 A1 | 7/2013 | Matsuda et al. | |
| 2013/0202863 A1 | 8/2013 | Shimamoto et al. | |
| 2013/0224466 A1 | 8/2013 | Fukatani et al. | |
| 2013/0236711 A1 | 9/2013 | Lu | |
| 2013/0273379 A1 | 10/2013 | Iwamoto et al. | |
| 2013/0323516 A1 | 12/2013 | Shimamoto et al. | |
| 2013/0337247 A1 | 12/2013 | Kitano et al. | |
| 2014/0224423 A1 | 8/2014 | Keller | |
| 2016/0244590 A1 | 8/2016 | Takada | |

FOREIGN PATENT DOCUMENTS

| | | |
|---|---|---|
| CN | 101678649 A | 3/2010 |
| CN | 102686530 A | 9/2012 |
| CN | 103140450 A | 6/2013 |
| CN | 103153904 A | 6/2013 |
| CN | 103391907 A | 11/2013 |
| EP | 1977887 A1 | 10/2008 |
| EP | 2848595 A1 | 3/2015 |
| JP | 62-158037 A | 7/1987 |
| JP | H02-22152 A | 1/1990 |
| JP | H02229742 A | 9/1990 |
| JP | H0797241 A | 4/1995 |
| JP | 2001526165 A | 12/2001 |
| JP | 2003-192402 A | 7/2003 |
| JP | 2007070200 A | 3/2007 |
| JP | 2008255226 A | 10/2008 |
| JP | 2009540065 A | 11/2009 |
| JP | 2010-523449 A | 7/2010 |
| JP | 2010523449 A | 7/2010 |
| JP | 2011-132120 A | 7/2011 |
| JP | 2013-6724 A | 1/2013 |
| JP | 2013-6725 A | 1/2013 |
| JP | 2013-006728 A | 1/2013 |
| JP | 2013-006729 A | 1/2013 |
| JP | 2013-107821 A | 6/2013 |
| JP | 2013107821 A | 6/2013 |
| JP | 2014156390 A | 8/2014 |
| TW | 201016459 A | 5/2010 |
| WO | 9932283 A1 | 7/1999 |
| WO | 2008122608 A1 | 10/2008 |
| WO | 2012043816 A1 | 4/2012 |
| WO | 2013168714 A1 | 11/2013 |
| WO | 2013181484 A1 | 12/2013 |
| WO | 2013188489 A1 | 12/2013 |
| WO | 2014/126251 A1 | 8/2014 |
| WO | 2015152241 A1 | 10/2018 |

OTHER PUBLICATIONS

International Search Report issued in International Application No. PCT/JP2015/075937; dated Dec. 1, 2015 (2 pages).
International Search Report issued in International Application No. PCT/JP2015/075938; dated Dec. 1, 2015 (2 pages).
International Preliminary Report on Patentability issued in International Application No. PCT/JP2015/075932; dated Mar. 16, 2017 (10 pages).
International Preliminary Report on Patentability issued in International Application No. PCT/JP2015/075936; dated Mar. 16, 2017 (10 pages).
International Preliminary Report on Patentability issued in International Application No. PCT/JP2015/075938; dated Mar. 16, 2017 (10 pages).
International Preliminary Report on Patentability and Written Opinion issued in International Application No. PCT/JP2015/075933; dated Mar. 23, 2017 (12 pages).
International Preliminary Report on Patentability and Written Opinion issued in International Application No. PCT/JP2015/075934; dated Mar. 23, 2017 (11 pages).
International Preliminary Report on Patentability and Written Opinion issued in International Application No. PCT/JP2015/075935; dated Mar. 23, 2017 (11 pages).
International Preliminary Report on Patentability and Written Opinion issued in International Application No. PCT/JP2015/075937; dated Mar. 23, 2017 (11 pages).
"Fumed Silica Product Information," Sigma-Aldrich, 2003 (3 pages).
Office Action issued in U.S. Appl. No. 15/455,355, dated Sep. 20, 2018 (13 pages).
Office Action issued in U.S. Appl. No. 15/455,293, dated Sep. 20, 2018 (10 pages).
Office Action issued in U.S. Appl. No. 15/455,323, dated Sep. 20, 2018 (8 pages).
Office Action issued in U.S. Appl. No. 15/455,457, dated Sep. 21, 2018 (26 pages).
Office Action issued in U.S. Appl. No. 15/455,457, dated May 3, 2018 (17 pages).
Office Action issued in U.S. Appl. No. 15/455,457, dated Oct. 6, 2017 (18 pages).
Extended European Search Report dated Mar. 20, 2018, issued in European Patent Application No. 15839510.3 (11 pages).
Extended European Search Report dated Mar. 20, 2018, issued in European Patent Application No. 15840765.0 (11 pages).
Extended European Search Report dated Mar. 20, 2018, issued in European Patent Application No. 15840754.4 (13 pages).
Extended European Search Report dated Mar. 20, 2018, issued in European Patent Application No. 15839712.5 (10 pages).
Extended European Search Report dated Mar. 22, 2018, issued in European Patent Application No. 15840071.3 (12 pages).
Extended European Search Report dated Mar. 20, 2018, issued in European Patent Application No. 15839981.6 (11 pages).
Extended European Search Report dated Mar. 20, 2018, issued in European Patent Application No. 15840260.2 (12 pages).
J. Ho et al; "Mesoporous silica spheres from colloids"; Journal of Colloid and Interface Science, vol. 308, pp. 374-380; 2007 (8 pages).
I. Ab Rahman et al; "Synthesis of Silica Nanoparticles by Sol-Gel: Size-Dependent Properties, Surface Modification, and Applications in Silica-Polymer Nanocomposites—A Review"; Journal of Nanomaterials, 2012 (16 pages).
H. S. Katz et al; "Handbook of Fillers for Plastics"; Van Nostrand Reinhold, 1987 (8 pages).
Database WPI, Week 200808, Oct. 18, 2007, Thomson Scientific, London, GB; AN 2008-B21371 and abstract of JP 2007-269880 (3 pages).
Opposition to Grant of Patent issued in Japanese Patent No. 6313781, dated Oct. 30, 2018 (53 pages).
Office Action issued in U.S. Appl. No. 15/455,461, dated Jun. 28, 2018 (12 pages).
Office Action issued in Chinese Application No. 201580048937.9; dated Mar. 13, 2019 (16 pages).
Office Action issued in U.S. Appl. No. 15/455,323; dated Apr. 4, 2019 (11 pages).
Office Action issued in Chinese Application No. 201580049143.4, dated Jan. 3, 2019 (17 pages).
Office Action issued in Chinese Application No. 201580048844.6, dated Jan. 3, 2019 (21 pages).
Office Action issued in Chinese Application No. 201580048985.8, dated Jan. 3, 2019 (21 pages).

(56) References Cited

OTHER PUBLICATIONS

Office Action issued in European Application No. 15840765.0, dated Jul. 29, 2019 (7 pages).
Office Action issued in European Application No. 15840754.4, dated Jul. 26, 2019 (5 pages).
Office Action issued in European Application No. 15839510.3, dated Jul. 26, 2019 (5 pages).
Office Action issued in European Application No. 15839712.5, dated Jul. 26, 2019 (5 pages).
Office Action issued in European Application No. 15840071.3, dated Jul. 26, 2019 (6 pages).
Office Action issued in European Application No. 15839981.6, dated Jul. 26, 2019 (5 pages).
Office Action issued in European Application No. 15840260.2, dated Jul. 26, 2019 (5 pages).
Office Action issued in Taiwanese Application No. 105108139, dated Jul. 29, 2019 (7 pages).
Office Action issued in Indian Application No. 201737004760, dated Aug. 29, 2019 (6 pages).
Office Action issued in Indian Application No. 201737004764, dated Aug. 21, 2019 (6 pages).
Office Action issued in Indian Application No. 201737004763, dated Aug. 28, 2019 (7 pages).
Office Action issued in Indian Application No. 201737004757, dated Sep. 19, 2019 (7 pages).
Office Action issued in Indian Application No. 201737004758, dated Aug. 29, 2019 (6 pages).
Office Action issued in Indian Application No. 201737004759, dated Aug. 28, 2019 (7 pages).
Office Action issued in Indian Application No. 201737004765, dated Sep. 19, 2019 (6 pages).
Office Action issued in Chinese Application No. 201580049142.X, dated Oct. 8, 2018 (8 pages).
Office Action issued in Chinese Application No. 201580049119.0, dated Oct. 8, 2018 (8 pages).
Office Action issued in Chinese Application No. 201580045774.9, dated Oct. 29, 2018 (8 pages).
M. Fuji et al., "Surface properties of nanosize hollow silica particles on the molecular level," Advanced Powder Technol., vol. 18, No. 1, pp. 81-91, 2007 (11 pages).
Office Action issued in corresponding Tawainese Application No. 105108141; dated Jan. 30, 2020 (10 pages).
Office Action issued in U.S. Appl. No. 15/455,293; dated Feb. 3, 2020 (15 pages).
Office Action issued in U.S. Appl. No. 15/455,379; dated Dec. 27, 2019 (20 pages).
Ex Parte Quayle Action issued in corresponding U.S. Appl. No. 15/455,323; dated Feb. 6, 2020 (7 pages).
Office Action issued in U.S. Appl. No. 15/455,355; dated Feb. 4, 2020 (11 pages).
Office Action issued in European Application No. 15839510.3, dated Feb. 19, 2020 (5 pages).
Office Action issued in U.S. Appl. No. 15/455,457, dated Mar. 16, 2020 (13 pages).
Toyota Tsusho Corporation, "World First Sales of 'Heating Shielding and Thermal Insulating Film for Windows' Using Nanotechonology Material—Contributing towards the alleviation of electric power shortages, due to the eathequake-", Oct. 6, 2011 (3 pages).
Office Action issued in U.S. Appl. No. 15/455,379, dated Jul. 16, 2020 (20 pages).
M. Jafari et al. "Synthesis of antistatic hybrid nanocomposite coatings using surface modified indium tin oxide (ITO) nanoparticles", Journal of Coatings Technology and Research, (Jan. 2014); pp. 587-593 (7 pages).
Office Action issued in U.S. Appl. No. 15/455,293, dated Sep. 11, 2020 (17 pages).
B. Shuguang et al., "Chinese New Material Development Almanac (2007-2008)", China Science and Technology Press, pp. 866 (7pages).
Office Action issued in Chinese Application No. 201580049119.0; dated May 13, 2019 (15 pages).
Office Action issued in corresponding Japanese Application No. 2019-189349; dated Dec. 8, 2020 (8 pages).
PCI Mag: https://www.pcimag.com/articles/102921-spherical-precipitated-silica (2017) (6 pages).
Office Action issued in related U.S. Appl. No. 15/455,457 dated Nov. 17, 2020 (15 pages).
Extended European Search Report dated Feb. 5, 2021, issued in European Patent Application No. 20207446.4 (10 pages).
Office Action issued in U.S. Appl. No. 16/690,655, dated May 26, 2021 (58 pages).
Office Action issued in related U.S. Appl. No. 15/455,379 dated Jun. 21, 2021 (31 pages).
Office Action issued in related U.S. Appl. No. 16/935,522 dated Jun. 23, 2021 (26 pages).

* cited by examiner

INTERLAYER FOR LAMINATED GLASS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between two glass plates.

Examples of the interlayer film for laminated glass include a single-layered interlayer film having a one-layer structure and a multi-layered interlayer film having a two or more-layer structure.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount greater than 30 parts by weight. This sound insulating layer can be used alone as a single-layered interlayer film.

Furthermore, the following Patent Document 1 also describes a multi-layered interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount of 30 parts by weight or less.

The following Patent Document 2 discloses an interlayer film which is constituted of a polymer layer having a glass transition temperature of 33° C. or higher. In Patent Document 2, a technique of arranging the polymer layer between glass plates with a thickness of 4.0 mm or less is described.

The following Patent Document 3 discloses an interlayer film including a polyvinyl acetal (A), at least one kind of plasticizer (B), fumed silica (C) and at least one kind of basic compound (D). In this interlayer film, the difference in refractive index between the fumed silica (C) and a plasticized polyvinyl acetal (A+B) is 0.015 or less, and the weight ratio C/(A+B) is 2.7/100 to 60/100.

RELATED ART DOCUMENTS

Patent Documents

Patent Document 1: JP 2007-070200 A
Patent Document 2: US 2013/0236711 A1
Patent Document 3: WO 2008/122608 A1

SUMMARY

With regard to laminated glass prepared with such a conventional interlayer film described in Patent Documents 1 to 3, there are cases where the laminated glass is low in flexural rigidity. As such, for example, when used for a side door of an automobile, laminated glass with no fixing frame sometimes causes troubles in opening/closing of the glass due to the deflection attributed to the low rigidity of the laminated glass.

Moreover, in recent years, for the purpose of attaining reduced weight of laminated glass, a technique for making the thickness of a glass plate thin has been desired. In laminated glass prepared with an interlayer film sandwiched between two glass plates, when the thickness of the glass plate is thinned, maintaining the flexural rigidity sufficiently high is extremely difficult.

For example, as long as the rigidity of laminated glass, even with thin glass plates, can be enhanced by virtue of the interlayer film, laminated glass can be reduced in weight. When laminated glass is light in weight, the amount of the material used for the laminated glass can be decreased and the environmental load can be reduced. Furthermore, when laminated glass being light in weight is used for an automobile, the fuel consumption can be improved, and as a result, the environmental load can be reduced.

In this connection, in Patent Document 3, it has been described that dynamic characteristics such as tensile strength are improved. However, in general, tensile strength and flexural rigidity are different from each other. Even if the tensile strength can be heightened to some extent, there are cases where the flexural rigidity fails to be sufficiently heightened.

Moreover, with respect to laminated glass prepared with an interlayer film, in addition to being high in flexural rigidity, being also high in sound insulating properties is desired. In Patent Document 3, even if the tensile strength can be heightened, there are cases where the sound insulating properties fail to become sufficiently high. In particular, there is no suggestion that the flexural rigidity of laminated glass is insufficient when a glass plate thinned in thickness and an interlayer film provided with a sound insulating layer having a low glass transition temperature are combined.

One or more embodiments of the present invention provide an interlayer film for laminated glass with which the flexural rigidity of laminated glass can be enhanced and the sound insulating properties of laminated glass can be heightened. Moreover, one or more embodiments of the present invention provide laminated glass prepared with the interlayer film for laminated glass.

According to one or more embodiments of the present invention, there is provided an interlayer film for laminated glass having a one-layer structure or a two or more-layer structure, including a first layer containing a polyvinyl acetal resin and a plasticizer, the first layer containing silica particles, and the ratio of the content of the silica particles in the first layer to the total of the content of the polyvinyl acetal resin in the first layer and the content of the plasticizer in the first layer being 0.03 or more and 0.4 or less.

In one or more embodiments of the interlayer film for laminated glass according to the present invention, the glass transition temperature of the first layer is 5° C. or less.

In one or more embodiments of the interlayer film for laminated glass according to the present invention, the content of the silica particles in the first layer is 5 parts by weight or more and 64 parts by weight or less relative to 100 parts by weight of the polyvinyl acetal resin in the first layer.

In one or more embodiments of the interlayer film for laminated glass according to the present invention, the interlayer film further includes a second layer containing a polyvinyl acetal resin and a plasticizer, and the second layer is arranged on a first surface side of the first layer.

In one or more embodiments of the interlayer film for laminated glass according to the present invention, the glass transition temperature of the first layer is lower than the glass transition temperature of the second layer.

In one or more embodiments of the interlayer film for laminated glass according to the present invention, the content of the hydroxyl group of the polyvinyl acetal resin in the first layer is lower than the content of the hydroxyl group of the polyvinyl acetal resin in the second layer.

In one or more embodiments of the interlayer film for laminated glass according to the present invention, the content of the plasticizer in the first layer relative to 100 parts by weight of the polyvinyl acetal resin in the first layer is greater than the content of the plasticizer in the second layer relative to 100 parts by weight of the polyvinyl acetal resin in the second layer.

In one or more embodiments of the interlayer film for laminated glass according to the present invention, the content of the hydroxyl group of the polyvinyl acetal resin in the second layer is 32% by mole or more.

In one or more embodiments of the interlayer film for laminated glass according to the present invention, the content of the plasticizer in the second layer is 35 parts by weight or less relative to 100 parts by weight of the polyvinyl acetal resin in the second layer.

In one or more embodiments of the interlayer film for laminated glass according to the present invention, the interlayer film further includes a third layer containing a polyvinyl acetal resin and a plasticizer, and the third layer is arranged on a second surface side opposite to the first surface of the first layer.

In one or more embodiments of the interlayer film for laminated glass according to the present invention, the thickness of the first layer is 0.4T or less when the thickness of the interlayer film for laminated glass is defined as T.

In one or more embodiments of the interlayer film for laminated glass according to the present invention, when a sheet of laminated glass is obtained by sandwiching the interlayer film for laminated glass between two sheets of green glass with a thickness of 2 mm in accordance with JIS R3208, the visible light transmittance of the sheet of laminated glass obtained is 70% or more.

In one or more embodiments of the interlayer film for laminated glass according to the present invention, the interlayer film is used together with a first glass plate having a thickness of 1 mm or less, and is arranged between the first glass plate and a second glass plate to be used for obtaining a sheet of laminated glass.

According to one or more embodiments of the present invention, there is provided laminated glass including a first laminated glass member, a second laminated glass member and the interlayer film for laminated glass described above, the interlayer film for laminated glass being arranged between the first laminated glass member and the second laminated glass member.

In one or more embodiments of the laminated glass according to the present invention, the first laminated glass member is a first glass plate and the thickness of the first glass plate is 1 mm or less.

Since the interlayer film for laminated glass according to one or more embodiments of the present invention includes a first layer containing a polyvinyl acetal resin and a plasticizer, the first layer contains silica particles and the ratio of the content of the silica particles in the first layer to the total of the content of the polyvinyl acetal resin in the first layer and the content of the plasticizer in the first layer is 0.03 or more and 0.4 or less, the flexural rigidity of laminated glass prepared with the interlayer film can be enhanced and the sound insulating properties of the laminated glass can be heightened.

DESCRIPTION OF EMBODIMENTS

Figure 1:
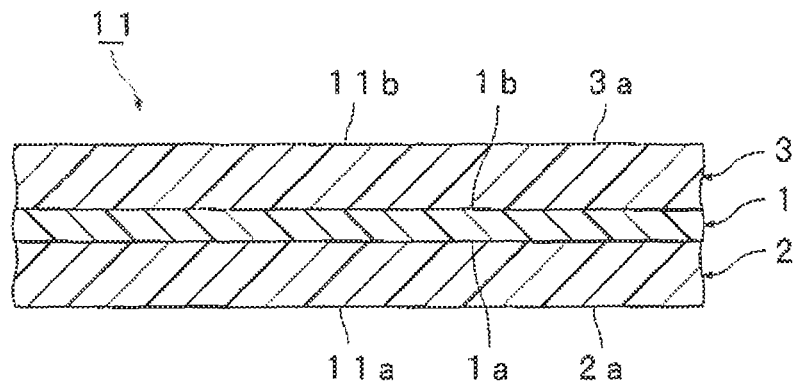
FIG. 1 is a sectional view schematically showing an interlayer film for laminated glass in accordance with one or more embodiments of the present invention.

Hereinafter, one or more embodiments of the present invention will be described in detail.

An interlayer film for laminated glass (in the present specification, sometimes abbreviated as an "interlayer film") according to one or more embodiments of the present invention has a one-layer structure or a two or more-layer structure. The interlayer film according to one or more embodiments of the present invention may have a one-layer structure and may have a two or more-layer structure. The interlayer film according to one or more embodiments of the present invention may have a two-layer structure and may have a three or more-layer structure. The interlayer film according to one or more embodiments of the present invention is provided with a first layer containing a polyvinyl acetal resin and a plasticizer. The interlayer film according to one or more embodiments of the present invention may be a single-layered interlayer film provided with only the first layer and may be a multi-layered interlayer film provided with the first layer and another layer.

In the interlayer film according to one or more embodiments of the present invention, the first layer contains silica particles.

In the interlayer film according to one or more embodiments of the present invention, the ratio of the content of the silica particles in the first layer to the total of the content of the polyvinyl acetal resin in the first layer and the content of the plasticizer in the first layer is 0.03 or more and 0.4 or less.

Since the interlayer film according to one or more embodiments of the present invention is provided with the above-mentioned configuration, the flexural rigidity of laminated glass prepared with the interlayer film can be enhanced. Moreover, for obtaining laminated glass, there are many cases in which the interlayer film is arranged between a first glass plate and a second glass plate. Even when the thickness of a first glass plate is thinned, by the use of the interlayer film according to one or more embodiments of the present invention, the flexural rigidity of laminated glass can be sufficiently enhanced. Moreover, even when the thicknesses of both a first glass plate and a second glass plate are thinned, by the use of the interlayer film according to one or more embodiments of the present invention, the flexural rigidity of laminated glass can be sufficiently enhanced. In this connection, when the thicknesses of both a first glass plate and a second glass plate are thickened, the flexural rigidity of laminated glass is further enhanced.

Furthermore, since the interlayer film according to one or more embodiments of the present invention is provided with the above-mentioned configuration, the sound insulating properties of laminated glass prepared with the interlayer film can also be heightened.

The interlayer film may have a two or more-layer structure and may be provided with a second layer in addition to a first layer. The interlayer film may be further provided with a second layer containing a polyvinyl acetal resin and a plasticizer. When the interlayer film is provided with the second layer, the second layer is arranged on a first surface side of the first layer.

The interlayer film may have a three or more-layer structure and may be provided with a third layer in addition to a first layer and a second layer. The interlayer film may be further provided with a third layer containing a polyvinyl acetal resin and a plasticizer. When the interlayer film is provided with the second layer and the third layer, the third layer is arranged on a second surface side opposite to the first surface of the first layer.

A surface at a side opposite to the first layer side of the second layer may be a surface on which a laminated glass member or a glass plate is layered. The thickness of a glass plate layered on the second layer may be 1 mm or less. A second surface at a side opposite to a first surface (surface at the second layer side) of the first layer may be a surface on which a laminated glass member or a glass plate is layered. The thickness of a glass plate layered on the first layer may be 1 mm or less. A surface at a side opposite to the first layer side of the third layer may be a surface on which a laminated glass member or a glass plate is layered. The thickness of a glass plate layered on the third layer may be 1 mm or less.

Since the flexural rigidity can be sufficiently enhanced by virtue of the interlayer film, the interlayer film is used together with a first glass plate having a thickness of 1 mm or less, and is arranged between the first glass plate and a second glass plate to be suitably used for obtaining laminated glass. Since the flexural rigidity can be sufficiently enhanced by virtue of the interlayer film, the interlayer film is used together with a first glass plate having a thickness of 1 mm or less and a second glass plate having a thickness of 1 mm or less, and is arranged between the first glass plate and the second glass plate to be more suitably used for obtaining laminated glass.

Hereinafter, one or more embodiments of the present invention will be described with reference to the drawings.

FIG. 1 shows an interlayer film for laminated glass in accordance with one or more embodiments of the present invention schematically represented as a sectional view.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 is provided with a first layer 1, a second layer 2 and a third layer 3. The second layer 2 is arranged on a first surface 1a of the first layer 1 to be layered thereon. The third layer 3 is arranged on a second surface 1b opposite to the first surface 1a of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (a second layer 2/a first layer 1/a third layer 3) in which the second layer 2, the first layer 1 and the third layer 3 are layered in this order.

In this connection, other layers may be arranged between the second layer 2 and the first layer 1 and between the first layer 1 and the third layer 3, respectively. Each of the second layer 2 and the third layer 3 may be directly layered on the first layer 1. Examples of another layer include a layer containing polyethylene terephthalate and the like.

The first layer 1 contains a polyvinyl acetal resin, a plasticizer and silica particles. The second layer 2 may contain a polyvinyl acetal resin, and the second layer 2 may contain a plasticizer. The third layer 3 may contain a polyvinyl acetal resin, and the third layer 3 may contain a plasticizer.

Figure 2:
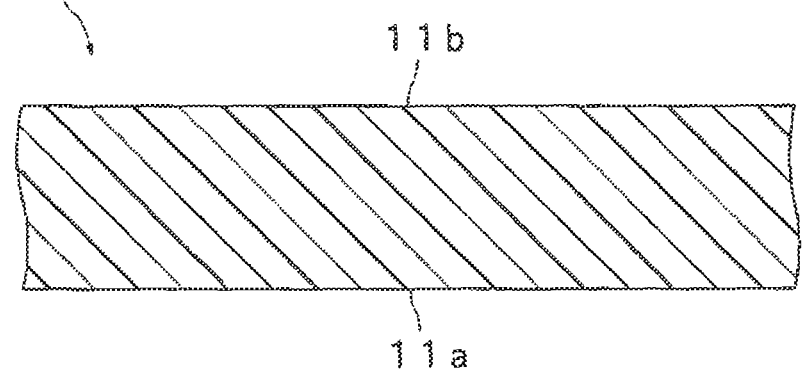
FIG. 2 is a sectional view schematically showing an interlayer film for laminated glass in accordance with one or more embodiments of the present invention.

FIG. 2 shows an interlayer film for laminated glass in accordance with one or more embodiments of the present invention schematically represented as a sectional view.

An interlayer film 11A shown in FIG. 2 is a single-layered interlayer film having a one-layer structure. The interlayer film 11A is a first layer. The interlayer film 11A is used for obtaining laminated glass. The interlayer film 11A is an interlayer film for laminated glass. The interlayer film 11A (first layer) contains a polyvinyl acetal resin, a plasticizer and silica particles.

The interlayer film may be provided with a first layer as an intermediate layer of the interlayer film or a layer which is not a surface layer of the interlayer film. The interlayer film may be provided with a second layer as a surface layer of the interlayer film. The interlayer film may be provided with a third layer as a surface layer of the interlayer film.

Hereinafter, the details of the first layer, the second layer and the third layer which constitute the interlayer film according to one or more embodiments of the present invention, and the details of each ingredient contained in the first layer, the second layer and the third layer will be described.

(Polyvinyl Acetal Resin or Thermoplastic Resin)

The first layer contains a polyvinyl acetal resin (hereinafter, sometimes described as a polyvinyl acetal resin (1)). The second layer may contain a thermoplastic resin (hereinafter, sometimes described as a thermoplastic resin (2)), and the second layer may contain a polyvinyl acetal resin (hereinafter, sometimes described as a polyvinyl acetal resin (2)) as the thermoplastic resin (2). The third layer may contain a thermoplastic resin (hereinafter, sometimes described as a thermoplastic resin (3)), and the third layer may contain a polyvinyl acetal resin (hereinafter, sometimes described as a polyvinyl acetal resin (3)) as the thermoplastic resin (3). Although the polyvinyl acetal resin (1), the polyvinyl acetal resin (2) and the polyvinyl acetal resin (3) may be the same as or different from one another, the polyvinyl acetal resin (1) may be different from the polyvinyl acetal resin (2) and the polyvinyl acetal resin (3) because the sound insulating properties can be further heightened. The thermoplastic resin (2) and the thermoplastic resin (3) may be the same as or different from each other. One kind of each of the polyvinyl acetal resin (1), the polyvinyl acetal resin (2) and the polyvinyl acetal resin (3) may be used alone, and two or more kinds thereof may be combinedly used. One kind of each of the thermoplastic resin (2) and the thermoplastic resin (3) may be used alone, and two or more kinds thereof may be combinedly used.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

For example, the polyvinyl acetal resin can be produced by acetalizing polyvinyl alcohol with an aldehyde. The polyvinyl acetal resin may be an acetalized product of polyvinyl alcohol. For example, the polyvinyl alcohol can be obtained by saponifying polyvinyl acetate. The saponification degree of the polyvinyl alcohol generally falls within the range of 70 to 99.9% by mole.

The average polymerization degree of the polyvinyl alcohol (PVA) may be 200 or more, 500 or more, 1500 or more, 1600 or more, 2600 or more, or 2700 or more, and may be 5000 or less, 4000 or less, or 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group in the polyvinyl acetal resin may fall within the range of 3 to 5, and the number of carbon atoms of the acetal group may be 4 or 5.

In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Of these, acetaldehyde, propionaldehyde, n-butyraldehyde, isobutyraldehyde, n-hexylaldehyde or n-valeraldehyde may be used, acetaldehyde, propionaldehyde, n-butyraldehyde, isobutyraldehyde or n-valeraldehyde may be used, and n-butyraldehyde or n-valeraldehyde may be used. One kind of the aldehyde may be used alone, and two or more kinds thereof may be combinedly used.

The content of the hydroxyl group (the amount of hydroxyl groups) of the polyvinyl acetal resin (1) may be 17% by mole or more, 20% by mole or more, or 22% by mole or more, and may be 30% by mole or less, less than 27% by mole, or 25% by mole or less. When the content of the hydroxyl group is the above lower limit or more, the adhesive force of the interlayer film is further heightened. In particular, when the content of the hydroxyl group of the polyvinyl acetal resin (1) is 20% by mole or more, the resin is high in reaction efficiency and is excellent in productivity, and moreover, when the content is less than 27% by mole, the sound insulating properties of laminated glass are further heightened. Moreover, when the content of the hydroxyl group is the above upper limit or less, the flexibility of the interlayer film is enhanced and the handling of the interlayer film is facilitated.

The content of the hydroxyl group (the amount of hydroxyl groups) of the polyvinyl acetal resin (1) may be 17% by mole or more, 20% by mole or more, or 22% by mole or more, and may be 28% by mole or less, 27% by mole or less, 25% by mole or less, or 24% by mole or less. When the content of the hydroxyl group is the above lower limit or more, the mechanical strength of the interlayer film is further heightened. In particular, when the content of the hydroxyl group of the polyvinyl acetal resin (1) is 20% by mole or more, the resin is high in reaction efficiency and is excellent in productivity, and moreover, when the content is 28% by mole or less, the sound insulating properties of laminated glass are further heightened. Moreover, when the content of the hydroxyl group is the above upper limit or less, the flexibility of the interlayer film is enhanced and the handling of the interlayer film is facilitated. In particular, although there is a tendency for laminated glass prepared with an interlayer film in which the content of the hydroxyl group of the polyvinyl acetal resin (1) is 28% by mole or less to become low in flexural rigidity, by making the first layer contain silica particles, the flexural rigidity can be significantly improved.

The content of the hydroxyl group of each of the polyvinyl acetal resin (2) and the polyvinyl acetal resin (3) may be 25% by mole or more, 28% by mole or more, 30% by mole or more, 31.5% by mole or more, 32% by mole or more, or 33% by mole or more, and may be 38% by mole or less, 37% by mole or less, 36.5% by mole or less, or 36% by mole or less. When the content of the hydroxyl group is the above lower limit or more, the flexural rigidity is further enhanced and the adhesive force of the interlayer film is further heightened. Moreover, when the content of the hydroxyl group is the above upper limit or less, the flexibility of the interlayer film is enhanced and the handling of the interlayer film is facilitated.

From the viewpoint of further heightening the sound insulating properties, the content of the hydroxyl group of the polyvinyl acetal resin (1) may be lower than the content of the hydroxyl group of the polyvinyl acetal resin (2). From the viewpoint of further heightening the sound insulating properties, the content of the hydroxyl group of the polyvinyl acetal resin (1) may be lower than the content of the hydroxyl group of the polyvinyl acetal resin (3). From the viewpoint of still further heightening the sound insulating properties, each of the absolute value of the difference between the content of the hydroxyl group of the polyvinyl acetal resin (1) and the content of the hydroxyl group of the polyvinyl acetal resin (2) and the absolute value of the difference between the content of the hydroxyl group of the polyvinyl acetal resin (1) and the content of the hydroxyl group of the polyvinyl acetal resin (3) may be 1% by mole or more, 5% by mole or more, 9% by mole or more, 10% by mole or more, or 12% by mole or more. Each of the absolute value of the difference between the content of the hydroxyl group of the polyvinyl acetal resin (1) and the content of the hydroxyl group of the polyvinyl acetal resin (2) and the absolute value of the difference between the content of the hydroxyl group of the polyvinyl acetal resin (1) and the content of the hydroxyl group of the polyvinyl acetal resin (3) may be 20% by mole or less. When silica particles are used, as compared with the case of not using silica particles, although there is a tendency for the sound insulating properties to be lowered by the influence of silica particles, by making the contents of the hydroxyl group satisfy the relationship like this, the sound insulating properties can be effectively heightened.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (1) may be 0.01% by mole or more, 0.1% by mole or more, 7% by mole or more, or 9% by mole or more, and may be 30% by mole or less, 25% by mole or less, 24% by mole or less, or 20% by mole or less.

When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and 25% by mole or less, the resulting laminated glass is excellent in penetration resistance.

The acetylation degree of each of the polyvinyl acetal resin (2) and the polyvinyl acetal resin (3) may be 0.01% by mole or more, or 0.5% by mole or more, and may be 10% by mole or less, or 2% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (1) (the butyralization degree in the case of a polyvinyl butyral resin) may be 47% by mole or more, or 60% by mole or more, and may be 85% by mole or less, 80% by mole or less, or 75% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) may be 55% by mole or more, or 60% by mole or more, and may be 75% by mole or less, or 71% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, the content of the hydroxyl group (the amount of hydroxyl groups), the acetalization degree (the butyralization degree) and the acetylation degree may be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, the polyvinyl acetal resin (1) may be a polyvinyl acetal resin (A) with an acetylation degree (a) of less than 8% by mole and an acetalization degree (a) of 65% by mole or more or a polyvinyl acetal resin (B) with an acetylation degree (b) of 8% by mole or more. Each of the polyvinyl acetal resin (2) and the polyvinyl acetal resin (3) may be the polyvinyl acetal resin (A) and may be the polyvinyl acetal resin (B).

The acetylation degree (a) of the polyvinyl acetal resin (A) may be less than 8% by mole, 7.9% by mole or less, 7.8% by mole or less, 6.5% by mole or less, or 6% by mole or less, and may be 0.1% by mole or more, 0.5% by mole or more, 2% by mole or more, 5% by mole or more, or 5.5% by mole or more. When the acetylation degree (a) is 0.1% by mole or more and less than 8% by mole, the transfer of a plasticizer can be easily controlled and the sound insulating properties of laminated glass are further heightened.

The acetalization degree (a) of the polyvinyl acetal resin (A) may be 65% by mole or more, 66% by mole or more, 67% by mole or more, 67.5% by mole or more, or 75% by mole or more, and may be 85% by mole or less, 84% by mole or less, 83% by mole or less, or 82% by mole or less. When the acetalization degree (a) is the above lower limit or more, the sound insulating properties of laminated glass are further heightened. When the acetalization degree (a) is the above upper limit or less, the reaction time required for producing the polyvinyl acetal resin (A) can be shortened.

The content (a) of the hydroxyl group of the polyvinyl acetal resin (A) may be 18% by mole or more, 19% by mole or more, 20% by mole or more, 21% by mole or more, or 23% by mole or more, and may be 31% by mole or less, 30% by mole or less, 29% by mole or less, or 28% by mole or less. When the content (a) of the hydroxyl group is the above lower limit or more, the adhesive force of the second layer is further heightened. When the content (a) of the hydroxyl group is the above upper limit or less, the sound insulating properties of laminated glass are further heightened.

The acetylation degree (b) of the polyvinyl acetal resin (B) may be 8% by mole or more, 9% by mole or more, 9.5% by mole or more, 10% by mole or more, or 10.5% by mole or more, and may be 30% by mole or less, 28% by mole or less, 26% by mole or less, or 24% by mole or less. When the acetylation degree (b) is the above lower limit or more, the sound insulating properties of laminated glass are further heightened. When the acetylation degree (b) is the above upper limit or less, the reaction time required for producing the polyvinyl acetal resin (B) can be shortened.

The acetalization degree (b) of the polyvinyl acetal resin (B) may be 50% by mole or more, 53% by mole or more, 55% by mole or more, or 60% by mole or more, and may be 78% by mole or less, 75% by mole or less, 72% by mole or less, or 70% by mole or less. When the acetalization degree (b) is the above lower limit or more, the sound insulating properties of laminated glass are further heightened. When the acetalization degree (b) is the above upper limit or less, the reaction time required for producing the polyvinyl acetal resin (B) can be shortened.

The content (b) of the hydroxyl group of the polyvinyl acetal resin (B) may be 18% by mole or more, 19% by mole or more, 20% by mole or more, 21% by mole or more, or 23% by mole or more, and may be 31% by mole or less, 30% by mole or less, 29% by mole or less, or 28% by mole or less. When the content (b) of the hydroxyl group is the above lower limit or more, the adhesive force of the second layer is further heightened. When the content (b) of the hydroxyl group is the above upper limit or less, the sound insulating properties of laminated glass are further heightened.

Each of the polyvinyl acetal resin (A) and the polyvinyl acetal resin (B) may be a polyvinyl butyral resin.

(Plasticizer)

The first layer (including a single-layered interlayer film) contains a plasticizer (hereinafter, sometimes described as a plasticizer (1)). The second layer may contain a plasticizer (hereinafter, sometimes described as a plasticizer (2)). The third layer may contain a plasticizer (hereinafter, sometimes described as a plasticizer (3)). By the use of the plasticizer or by using a polyvinyl acetal resin and a plasticizer together, the adhesive force of a layer containing the polyvinyl acetal resin and the plasticizer to a laminated glass member or another layer is moderately heightened. The plasticizer is not particularly limited. The plasticizer (1), the plasticizer (2) and the plasticizer (3) may be the same as or different from one another. One kind of each of the plasticizer (1), the plasticizer (2) and the plasticizer (3) may be used alone, and two or more kinds thereof may be combinedly used.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers may be used. The plasticizer may be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

The plasticizer may be a diester plasticizer represented by the following formula (1).

[Chemical 1]

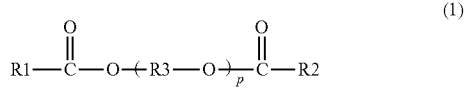

In the foregoing formula (1), R1 and R2 each represent an organic group with 2 to 10 carbon atoms, R3 represents an ethylene group, an isopropylene group or an n-propylene group, and p represents an integer of 3 to 10. R1 and R2 in the foregoing formula (1) each may be an organic group with 5 to 10 carbon atoms, and R1 and R2 each may be an organic group with 6 to 10 carbon atoms.

The plasticizer may include di-(2-butoxyethyl)-adipate (DBEA), triethylene glycol di-2-ethylhexanoate (3GO), triethylene glycol di-2-ethylbutyrate (3GH) or triethylene glycol di-2-ethylpropanoate. The plasticizer may include triethylene glycol di-2-ethylhexanoate (3GO), triethylene glycol di-2-ethylbutyrate (3GH) or triethylene glycol di-2-ethylpropanoate. The plasticizer may include triethylene glycol di-2-ethylhexanoate or triethylene glycol di-2-ethylbutyrate. The plasticizer may include triethylene glycol di-2-ethylhexanoate.

Each of the content of the plasticizer (2) (hereinafter, sometimes described as the content (2)) relative to 100 parts by weight of the thermoplastic resin (2) and the content of the plasticizer (3) (hereinafter, sometimes described as the content (3)) relative to 100 parts by weight of the thermoplastic resin (3) may be 10 parts by weight or more, 15 parts by weight or more, 20 parts by weight or more, or 24 parts by weight or more, and may be 40 parts by weight or less, 35 parts by weight or less, 32 parts by weight or less, or 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the flexural rigidity is further enhanced.

The content of the plasticizer (1) (hereinafter, sometimes described as the content (1)) relative to 100 parts by weight of the polyvinyl acetal resin (1) may be 50 parts by weight or more, 55 parts by weight or more, or 60 parts by weight or more, and may be 100 parts by weight or less, 90 parts by weight or less, 85 parts by weight or less, or 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

For the purpose of heightening the sound insulating properties of laminated glass, the content (1) may be greater than the content (2) and the content (1) may be greater than the content (3). In particular, although there is a tendency for laminated glass prepared with an interlayer film in which the content (1) is 55 parts by weight or more to become low in flexural rigidity, by making the first layer contain silica particles, the flexural rigidity can be significantly improved.

From the viewpoint of further heightening the sound insulating properties of laminated glass, each of the absolute value of the difference between the content (2) and the content (1) and the absolute value of the difference between the content (3) and the content (1) may be 10 parts by weight or more, 15 parts by weight or more, or 20 parts by weight or more. Each of the absolute value of the difference between the content (2) and the content (1) and the absolute value of the difference between the content (3) and the content (1) may be 80 parts by weight or less, 75 parts by weight or less, or 70 parts by weight or less.

(Silica Particles)

The first layer contains silica particles. By the use of the silica particle, without lowering the sound insulating properties, the flexural rigidity is further enhanced, and furthermore, the adhesive force between respective layers is also heightened. One kind of the silica particles may be used alone, and two or more kinds thereof may be combinedly used.

The specific surface area by the BET method of the silica particles may be 50 $m^2/g$ or more, 100 $m^2/g$ or more, 200 $m^2/g$ or more, 250 $m^2/g$ or more, or 300 $m^2/g$ or more, and may be 500 $m^2/g$ or less. The specific surface area can be measured by a gas adsorption method using a specific surface area/fine pore distribution measuring apparatus. Examples of the measuring apparatus include "ASAP 2420" available from SHIMADZU CORPORATION, and the like.

From the viewpoint of enhancing both of the flexural rigidity and the sound insulating properties of laminated glass, the ratio of the content of the silica particles to the total of the content of the polyvinyl acetal resin (1) and the content of the plasticizer (1) (the content of the silica particles/the total of the content of the polyvinyl acetal resin (1) and the content of the plasticizer (1)) is 0.03 or more and 0.4 or less. The ratio (the content of the silica particles/the total of the content of the polyvinyl acetal resin (1) and the content of the plasticizer (1)) may be 0.06 or more, 0.07 or more, or 0.12 or more, and may be 0.39 or less, 0.38 or less, 0.32 or less, or 0.25 or less. When the ratio is the above lower limit or more, the flexural rigidity is further enhanced. When the ratio is the above upper limit or less, the sound insulating properties are further heightened.

Relative to 100 parts by weight of the polyvinyl acetal resin (1), the content of the silica particles may be 1 part by weight or more, 5 parts by weight or more, 10 parts by weight or more, or 15 parts by weight or more, and may be 70 parts by weight or less, 64 parts by weight or less, 60 parts by weight or less, 55 parts by weight or less, 45 parts by weight or less, or most preferably 35 parts by weight or less. When the content of the silica particles is the above lower limit or more, the adhesive force between respective layers is further heightened and the flexural rigidity is further enhanced. When the content of the silica particles is the above upper limit or less, the sound insulating properties are further heightened.

(Heat Shielding Compound)

The interlayer film may include a heat shielding compound. The first layer may contain a heat shielding compound. The second layer may contain a heat shielding compound. The third layer may contain a heat shielding compound. One kind of the heat shielding compound may be used alone, and two or more kinds thereof may be combinedly used.

Ingredient X:

The interlayer film may include at least one kind of Ingredient X among a phthalocyanine compound, a naphthalocyanine compound and an anthracyanine compound. The first layer may contain the Ingredient X. The second layer may contain the Ingredient X. The third layer may contain the Ingredient X. The Ingredient X is a heat shielding compound. One kind of the Ingredient X may be used alone, and two or more kinds thereof may be combinedly used.

The Ingredient X is not particularly limited. As the Ingredient X, conventionally known phthalocyanine compound, naphthalocyanine compound and anthracyanine compound can be used.

With regard to the interlayer film and laminated glass, from the viewpoint of further enhancing the heat shielding properties thereof, the Ingredient X may be at least one kind selected from the group consisting of phthalocyanine, a derivative of phthalocyanine, naphthalocyanine and a derivative of naphthalocyanine, and the Ingredient X may be at least one kind among phthalocyanine and a derivative of phthalocyanine.

From the viewpoints of effectively enhancing the heat shielding properties and maintaining the visible light transmittance at a higher level over a long period of time, the Ingredient X may contain vanadium atoms or copper atoms. The Ingredient X may contain vanadium atoms and the Ingredient X may contain copper atoms. The Ingredient X may be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, the Ingredient X may have a structural unit in which an oxygen atom is bonded to a vanadium atom.

In 100% by weight of a layer containing the Ingredient X (a first layer, a second layer or a third layer), the content of the Ingredient X may be 0.001% by weight or more, 0.005% by weight or more, 0.01% by weight or more, or 0.02% by weight or more, and may be 0.2% by weight or less, 0.1% by weight or less, 0.05% by weight or less, or 0.04% by weight or less. When the content of the Ingredient X is the above lower limit or more and the above upper limit or less, the heat shielding properties are sufficiently enhanced and the visible light transmittance is sufficiently heightened. For example, it is possible to make the visible light transmittance 70% or more.

Heat Shielding Particles:

The interlayer film may include heat shielding particles. The first layer may contain the heat shielding particles. The second layer may contain the heat shielding particles. The third layer may contain the heat shielding particles. The heat shielding particle is a heat shielding compound. By the use of heat shielding particles, infrared rays (heat rays) can be effectively cut off. One kind of the heat shielding particles may be used alone, and two or more kinds thereof may be combinedly used.

From the viewpoint of further heightening the heat shielding properties of laminated glass, the heat shielding particles may be metal oxide particles. The heat shielding particle may be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Of these, since the heat ray shielding function is high, metal oxide particles, such as ATO particles, GZO particles, IZO particles, ITO particles and tungsten oxide particles, may be used. ITO particles or tungsten oxide particles may be used. In particular, since the heat ray shielding function is high and the particles are readily available, tin-doped indium oxide particles (ITO particles) may be used, and tungsten oxide particles may also be used.

With regard to the interlayer film and laminated glass, from the viewpoint of further enhancing the heat shielding properties thereof, the tungsten oxide particles may be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles may be used. With regard to the interlayer film and laminated glass, from the viewpoint of still further enhancing the heat shielding properties thereof, the cesium-doped tungsten oxide particles may be tungsten oxide particles represented by the formula: $Cs_{0.33}WO_3$.

The average particle diameter of the heat shielding particles may be 0.01 µm or more, 0.02 µm or more, and may be 0.1 µm or less, or 0.05 µm or less. When the average particle diameter is the above lower limit or more, the heat ray shielding properties are sufficiently heightened. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of a layer containing the heat shielding particles (a first layer, a second layer or a third layer), the content of the heat shielding particles may be 0.01% by weight or more, 0.1% by weight or more, 1% by weight or more, or 1.5% by weight or more, and may be 6% by weight or less, 5.5% by weight or less, 4% by weight or less, 3.5% by weight or less, or 3.0% by weight or less. When the content of the heat shielding particles is the above lower limit or more and the above upper limit or less, the heat shielding properties are sufficiently enhanced and the visible light transmittance is sufficiently heightened.

(Metal Salt)

The interlayer film may include at least one kind of metal salt (hereinafter, sometimes described as Metal salt M) among an alkali metal salt and an alkaline earth metal salt. The first layer may contain the Metal salt M. The second layer may contain the Metal salt M. The third layer may contain the Metal salt M. By the use of the Metal salt M, controlling the adhesivity between the interlayer film and a laminated glass member or the adhesivity between respective layers in the interlayer film is facilitated. One kind of the Metal salt M may be used alone, and two or more kinds thereof may be combinedly used.

The Metal salt M may contain at least one kind of metal selected from the group consisting of Li, Na, K, Rb, Cs, Mg, Ca, Sr and Ba. The metal salt included in the interlayer film may contain at least one kind of metal among K and Mg.

Moreover, the Metal salt M may be an alkali metal salt of an organic acid with 2 to 16 carbon atoms or an alkaline earth metal salt of an organic acid with 2 to 16 carbon atoms, and the Metal salt M may be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a layer containing the Metal salt M (a first layer, a second layer or a third layer) may be 5 ppm or more, 10 ppm or more, or ppm or more, and may be 300 ppm or less, 250 ppm or less, or 200 ppm or less. When the total of the contents of Mg and K is the above lower limit or more and the above upper limit or less, the adhesivity between the interlayer film and a laminated glass member or the adhesivity between respective layers in the interlayer film can be further well controlled.

(Ultraviolet Ray Screening Agent)

The interlayer film may include an ultraviolet ray screening agent. The first layer may contain an ultraviolet ray screening agent. The second layer may contain an ultraviolet ray screening agent. The third layer may contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be combinedly used.

Examples of the ultraviolet ray screening agent include an ultraviolet ray absorber. The ultraviolet ray screening agent may be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure, an ultraviolet ray screening agent having a benzophenone structure, an ultraviolet ray screening agent having a triazine structure, an ultraviolet ray screening agent having a malonic acid ester structure, an ultraviolet ray screening agent having an oxanilide structure, an ultraviolet ray screening agent having a benzoate structure, and the like.

Examples of the ultraviolet ray absorber containing a metal atom include platinum particles, particles in which the surface of platinum particles is coated with silica, palladium particles, particles in which the surface of palladium particles is coated with silica, and the like. It is possible that the ultraviolet ray screening agent not be heat shielding particles.

The ultraviolet ray screening agent may be an ultraviolet ray screening agent having a benzotriazole structure, an ultraviolet ray screening agent having a benzophenone structure, an ultraviolet ray screening agent having a triazine structure or an ultraviolet ray screening agent having a benzoate structure. It may be an ultraviolet ray screening agent having a benzotriazole structure or an ultraviolet ray screening agent having a benzophenone structure. It may be an ultraviolet ray absorber having a benzotriazole structure.

Examples of the ultraviolet ray absorber containing a metal oxide include zinc oxide, titanium oxide, cerium oxide, and the like. Furthermore, with regard to the ultraviolet ray absorber containing a metal oxide, the surface thereof may be coated with any material. Examples of the coating material for the surface of the ultraviolet ray absorber containing a metal oxide include an insulating metal oxide, a hydrolyzable organosilicon compound, a silicone compound, and the like.

Examples of the ultraviolet ray absorber having a benzotriazole structure include ultraviolet ray absorbers having a benzotriazole structure such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). The ultraviolet ray screening agent may be an ultraviolet ray absorber having a benzotriazole structure containing a halogen atom, and the ultraviolet ray screening agent may be an ultraviolet ray absorber having a benzotriazole structure containing a chlorine atom, since those are excellent in ultraviolet ray absorbing performance.

Examples of the ultraviolet ray absorber having a benzophenone structure include octabenzone ("Chimassorb 81" available from BASF Japan Ltd.), and the like.

Examples of the ultraviolet ray absorber having a triazine structure include "LA-F70" available from ADEKA CORPORATION, 2-(4,6-diphenyl-1,3,5-triazine-2-yl)-5-[(hexyl) oxy]-phenol ("Tinuvin 1577FF" available from BASF Japan Ltd.), and the like.

Examples of the ultraviolet ray screening agent having a malonic acid ester structure include dimethyl-2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray absorber having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of a layer containing the ultraviolet ray screening agent (a first layer, a second layer or a third layer), the content of the ultraviolet ray screening agent may be 0.1% by weight or more, 0.2% by weight or more, 0.3% by weight or more, or 0.5% by weight or more, and may be 2.5% by weight or less, 2% by weight or less, 1% by weight or less, or 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

The interlayer film may include an oxidation inhibitor. The first layer may contain an oxidation inhibitor. The second layer may contain an oxidation inhibitor. The third layer may contain an oxidation inhibitor. One kind of the oxidation inhibitor may be used alone, and two or more kinds thereof may be combinedly used.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

The oxidation inhibitor may be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl) butane, tetrakis[methylene-3-(3',5'-butyl-4-hydroxyphenyl) propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol) butyric acid glycol ester, bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, tris(2,4-di-t-butylphenyl) phosphite, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, the content of the oxidation inhibitor may be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor may not be attained, the content of the oxidation inhibitor may be 2% by weight or less in 100% by weight of the interlayer film or in 100% by weight of the layer containing the oxidation inhibitor.

(Other Ingredients)

Each of the first layer, the second layer and the third layer may contain additives such as a coupling agent containing silicon, aluminum or titanium, a dispersing agent, a surfactant, a flame retardant, an antistatic agent, a pigment, a dye, an adhesive force regulating agent, a moisture-resistance improving agent, a fluorescent brightening agent and an infrared ray absorber, as necessary. One kind of these additives may be used alone, and two or more kinds thereof may be combinedly used.

(Other Details of Interlayer Film for Laminated Glass)

From the viewpoint of further heightening the sound insulating properties of laminated glass, the glass transition temperature of the first layer may be 15° C. or less, 10° C. or less, 5° C. or less, or 0° C. or less. The glass transition temperature of the first layer may be −20° C. or more.

From the viewpoint of further enhancing the flexural rigidity of laminated glass, the glass transition temperature of the first layer may be lower than the glass transition temperature of each of the second layer and the third layer. By making the first layer having a glass transition temperature lower than that of each of the second layer and the third layer contain silica particles and providing the interlayer film with each of the second layer and the third layer having a glass transition temperature higher than that of the first layer, the flexural rigidity of laminated glass is significantly improved. From the viewpoint of still further enhancing the flexural rigidity of laminated glass, the absolute value of the difference between the glass transition temperature of the first layer and the glass transition temperature of each of the second layer and the third layer may be 10° C. or more, 20° C. or more, 30° C. or more, or 35° C. or more. The absolute value of the difference between the glass transition temperature of the first layer and the glass transition temperature of each of the second layer and the third layer may be 70° C. or less.

Examples of a method of measuring the glass transition temperature include a method of measuring the viscoelasticity of an interlayer film by means of a viscoelasticity measuring apparatus "DVA-200" available from IT KEISOKU SEIGYO K.K. immediately after the interlayer film obtained is stored for 12 hours under an environment of a room temperature of 23±2° C. and a humidity of 25±5%. The interlayer film may be cut into a size of 8 mm in longitudinal width by 5 mm in lateral width and be measured, using the shear mode, for the glass transition temperature under the condition in which the temperature is increased from −30° C. to 100° C. at a temperature increasing rate of 5° C./minute and under the condition of a frequency of 1 Hz and a strain of 0.08%.

From the viewpoint of further heightening the sound insulating properties, the tan δ at the glass transition temperature of the first layer may be 0.6 or more or 0.7 or more. The tan δ at the glass transition temperature of the first layer may be 3 or less.

The thickness of the interlayer film is not particularly limited. From the viewpoint of the practical aspect and the viewpoint of sufficiently enhancing the penetration resistance and the flexural rigidity of laminated glass, the thickness of the interlayer film may be 0.1 mm or more, or 0.25 mm or more, and may be 3 mm or less, 2 mm or less, or 1.5 mm or less. When the thickness of the interlayer film is the above lower limit or more, the penetration resistance and the flexural rigidity of laminated glass are enhanced. When the thickness of the interlayer film is the above upper limit or less, the transparency of the interlayer film is further improved.

The thickness of the interlayer film is defined as T. The thickness of the first layer may be 0.0625T or more, or 0.1T or more, and may be 0.4T or less, 0.375T or less, 0.25T or less, or 0.15T or less. When the thickness of the first layer is 0.4T or less, the flexural rigidity is further improved.

The thickness of each of the second layer and the third layer may be 0.3T or more, 0.3125T or more, or 0.375T or more, and may be 0.9375T or less, or 0.9T or less. The thickness of each of the second layer and the third layer may be 0.46875T or less and may be 0.45T or less. Moreover, when the thickness of each of the second layer and the third layer is the above lower limit or more and the above upper limit or less, the rigidity and the sound insulating properties of laminated glass are further enhanced.

The total thickness of the second layer and the third layer may be 0.625T or more, 0.75T or more, or 0.85T or more, and may be 0.9375T or less, or 0.9T or less. Moreover, when the total thickness of the second layer and the third layer is the above lower limit or more and the above upper limit or less, the rigidity and the sound insulating properties of laminated glass are further enhanced.

The production method of the interlayer film according to one or more embodiments of the present invention is not particularly limited. In the case of a single-layered interlayer film, examples of the production method of the interlayer film according to one or more embodiments of the present invention include a method of extruding a resin composition with an extruder. In the case of a multi-layered interlayer film, examples of the production method of the interlayer film according to one or more embodiments of the present invention include a method of separately forming respective resin compositions used for constituting respective layers into respective layers, and then, for example, layering the respective obtained layers, a method of coextruding respective resin compositions used for constituting respective layers with an extruder and layering the respective layers, and the like. A production method of extrusion-molding may be used because the method is suitable for continuous production.

Since the production efficiency of the interlayer film is excellent, respective polyvinyl acetal resins contained in the second layer and the third layer may be the same as each other, and respective polyvinyl acetal resins contained in the second layer and the third layer may be the same as each other and respective plasticizers contained therein may be the same as each other. The second layer and the third layer may be formed from the same resin composition as each other.

At least one surface among surfaces of both sides of the interlayer film may have a recess/protrusion shape. The surfaces of both sides of the interlayer film may have a recess/protrusion shape. The method for forming the recess/protrusion shape is not particularly limited, and examples thereof include a lip emboss method, an embossing roll method, a calender roll method, a profile extrusion method, and the like. Since it is possible to quantitatively form many embosses with a recess/protrusion shape constituting a constant uneven pattern, the embossing roll method may be used.

(Laminated Glass)

Figure 3:
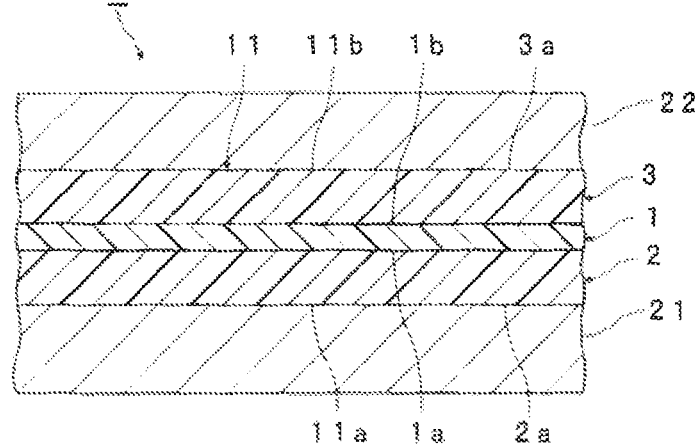
FIG. 3 is a sectional view schematically showing an example of laminated glass prepared with the interlayer film for laminated glass shown in FIG. 1.

FIG. 3 is a sectional view schematically showing an example of laminated glass prepared with the interlayer film for laminated glass shown in FIG. 1.

The laminated glass 31 shown in FIG. 3 is provided with a first laminated glass member 21, a second laminated glass member 22 and an interlayer film 11. The interlayer film 11 is arranged between the first laminated glass member 21 and the second laminated glass member 22 to be sandwiched therebetween.

The first laminated glass member 21 is layered on a first surface 11a of the interlayer film 11. The second laminated glass member 22 is layered on a second surface 11b opposite to the first surface 11a of the interlayer film 11. The first laminated glass member 21 is layered on an outer surface 2a of a second layer 2. The second laminated glass member 22 is layered on an outer surface 3a of a third layer 3.

Figure 4:
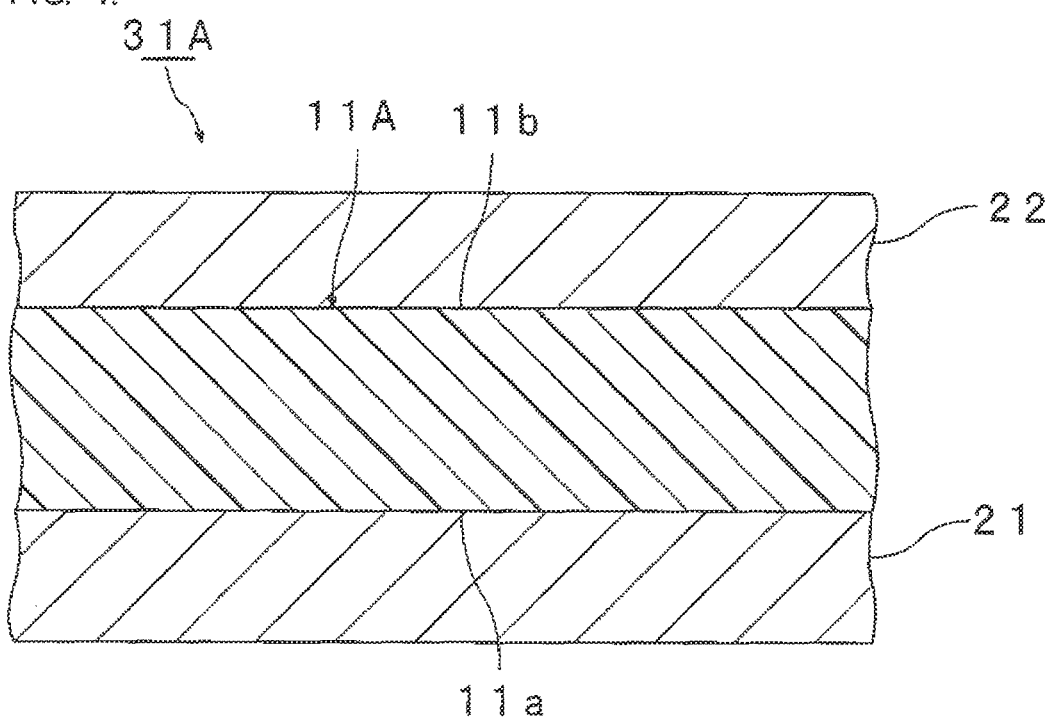
FIG. 4 is a sectional view schematically showing an example of laminated glass prepared with the interlayer film for laminated glass shown in FIG. 2.

FIG. 4 is a sectional view schematically showing an example of laminated glass prepared with the interlayer film for laminated glass shown in FIG. 2.

The laminated glass 31A shown in FIG. 4 is provided with a first laminated glass member 21, a second laminated glass member 22 and an interlayer film 11A. The interlayer film 11A is arranged between the first laminated glass member 21 and the second laminated glass member 22 to be sandwiched therebetween.

The first laminated glass member 21 is layered on a first surface 11a of the interlayer film 11A. The second laminated glass member 22 is layered on a second surface 11b opposite to the first surface 11a of the interlayer film 11A.

As described above, the laminated glass according to one or more embodiments of the present invention is provided with a first laminated glass member, a second laminated glass member and an interlayer film, and the interlayer film is the interlayer film for laminated glass according to one or more embodiments of the present invention. In the laminated glass according to one or more embodiments of the present invention, the above-mentioned interlayer film is arranged between the first laminated glass member and the second laminated glass member.

Examples of the laminated glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and at least one glass plate may be used.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thickness of the laminated glass member may be 1 mm or more, 5 mm or less, or 3 mm or less. Moreover, when the laminated glass member is a glass plate, the thickness of the glass plate may be 0.5 mm or more, or 0.7 mm or more, and may be 5 mm or less, or 3 mm or less. When the laminated glass member is a PET film, the thickness of the PET film may be 0.03 mm or more and may be 0.5 mm or less.

By the use of the interlayer film according to one or more embodiments of the present invention, even when the thickness of laminated glass is thin, the flexural rigidity of laminated glass can be maintained high. From the viewpoints of attaining reduced weight of laminated glass and decreasing the amount of the material for laminated glass to reduce the environmental load, and improving fuel consumption of an automobile by reduction in weight of laminated glass to reduce the environmental load, the thickness of the glass plate may be 2 mm or less, 1.8 mm or less, 1.5 mm or less, 1 mm or less, 0.8 mm or less, or 0.7 mm or less.

The method for producing the laminated glass is not particularly limited. For example, an interlayer film is sandwiched between the first laminated glass member and the second laminated glass member, and the air remaining between each of the first laminated glass member and the second laminated glass member and the interlayer film is removed by making the members to pass through a pressing roll or by putting the members into a rubber bag and sucking the contents under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained. At the time of producing the laminated glass, a first layer, a second layer and a third layer may be layered.

Each of the interlayer film and the laminated glass can be used for automobiles, railway vehicles, aircraft, ships, buildings and the like. Each of the interlayer film and the laminated glass can also be used for applications other than these applications. The interlayer film and the laminated glass may be an interlayer film and laminated glass for vehicles or for building respectively, and the interlayer film and the laminated glass may be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is used for obtaining laminated glass of an automobile.

From the viewpoint of obtaining laminated glass further excellent in transparency, the visible light transmittance of laminated glass may be 65% or more, or 70% or more. The visible light transmittance of laminated glass can be measured in accordance with JIS R3211 (1998). The visible light transmittance of laminated glass, which is obtained by sandwiching the interlayer film for laminated glass according to one or more embodiments of the present invention between two sheets of green glass (heat ray-absorbing plate glass) with a thickness of 2 mm in accordance with JIS R3208, may be 70% or more. The visible light transmittance may be 75% or more.

Hereinafter, one or more embodiments of the present invention will be described in more detail with reference to examples. The present invention is not limited only to these examples.

The following materials were prepared.

(Polyvinyl Acetal Resin)

Polyvinyl acetal resins shown in the following Tables 1 to 5 were appropriately used. In all polyvinyl acetal resins used, n-butyraldehyde which has 4 carbon atoms is used for the acetalization.

With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Plasticizer)

Triethylene glycol di-2-ethylhexanoate (3GO)

Di-(2-butoxyethyl)-adipate (DBEA)

(Silica Particles)

Silica particle (a) ("AEROSIL 380" available from NIPPON AEROSIL CO., LTD., the specific surface area by the BET method of 380±30 $m^2/g$)

Silica particle (b) ("BZ-400" available from TOSOH SILICA CORPORATION, the specific surface area by the BET method of 450 $m^2/g$)

Silica particle (c) ("AZ-204" available from TOSOH SILICA CORPORATION, the specific surface area by the BET method of 300 $m^2/g$)

Silica particle (d) ("AZ-201" available from TOSOH SILICA CORPORATION, the specific surface area by the BET method of 300 $m^2/g$)

(Ultraviolet Ray Screening Agent)

Tinuvin 326 (2-(2'-hydroxy-3'-t-butyl-5-methylphenyl)-5-chlorobenzotriazole, "Tinuvin 326" available from BASF Japan Ltd.)

(Oxidation Inhibitor)

BHT (2,6-di-t-butyl-p-cresol)

Example 1

Preparation of Composition for Forming First Layer:

One hundred parts by weight of a polyvinyl acetal resin of a kind of shown in the following Table 1, 60 parts by weight of a plasticizer (3GO), 20 parts by weight of the silica particles (a), 0.2 parts by weight of an ultraviolet ray screening agent (Tinuvin 326) and 0.2 part by weight of an oxidation inhibitor (BHT) were mixed to obtain a composition for forming a first layer.

Preparation of Composition for Forming Second Layer and Third Layer:

One hundred parts by weight of a polyvinyl acetal resin of a kind of shown in the following Table 1, 24 parts by weight of a plasticizer (3GO), 0.2 part by weight of an ultraviolet ray screening agent (Tinuvin 326) and 0.2 parts by weight of an oxidation inhibitor (BHT) were mixed to obtain a composition for forming a second layer and a third layer.

Preparation of Interlayer Film:

By coextruding the composition for forming a first layer and the composition for forming a second layer and a third layer using a coextruder, an interlayer film (780 μm in thickness) having a layered structure with a stack of a second layer (340 μm in thickness)/a first layer (100 μm in thickness)/a third layer (340 μm in thickness) was prepared.

Preparation of Laminated Glass a (for Flexural Rigidity Measurement):

Two washed and dried glass plates (clear float glass, 25 cm in longitudinal length×10 cm in transversal length×2.5 mm in thickness) were prepared. The obtained interlayer film was sandwiched between the two glass plates to obtain a laminate. The obtained laminate was put into a rubber bag and the inside thereof was degassed for 20 minutes at a degree of vacuum of 2660 Pa (20 torr). Afterward, while keeping the laminate degassed, furthermore, the laminate was held in place for 30 minutes at 90° C. and pressed under vacuum in an autoclave. The laminate thus preliminarily press-bonded was subjected to press-bonding for 20 minutes under conditions of 135° C. and a pressure of 1.2 MPa (12 kg/$cm^2$) in an autoclave to obtain a sheet of laminated glass A.

Preparation of Laminated Glass B (for Flexural Rigidity Measurement):

One washed and dried glass plate (clear float glass, 25 cm in longitudinal length×10 cm in transversal length×2.5 mm in thickness) was prepared. One washed and dried glass plate (Gorilla glass 2, 25 cm in longitudinal length×10 cm in transversal length×0.7 mm in thickness) was prepared. Except that the two glass plates were used, a sheet of Laminated glass B was obtained in the same manner as that for the Laminated glass A.

Preparation of Laminated Glass C (for Flexural Rigidity Measurement):

Two washed and dried glass plates (Gorilla glass 2, 25 cm in longitudinal length×10 cm in transversal length×0.7 mm in thickness) were prepared. Except that the two glass plates were used, a sheet of Laminated glass C was obtained in the same manner as that for the Laminated glass A.

Preparation of Laminated Glass F (for Flexural Rigidity Measurement):

One washed and dried glass plate (clear float glass, 25 cm in longitudinal length×10 cm in transversal length×1.8 mm in thickness) was prepared. One washed and dried glass plate (clear float glass, 25 cm in longitudinal length×10 cm in transversal length×1.0 mm in thickness) was prepared. Except that the two glass plates were used, a sheet of Laminated glass F was obtained in the same manner as that for the Laminated glass A.

Preparation of Laminated Glass D (for Sound Insulating Properties Measurement):

The interlayer film obtained was cut into a size of cm in longitudinal length×2.5 cm in transversal length. Next, between two sheets of green glass (30 cm in longitudinal length×2.5 cm in transversal length×2 mm in thickness) in accordance with JIS R3208, the interlayer film was sandwiched to obtain a laminate. The laminate was put into a rubber bag and degassed for 20 minutes at a degree of vacuum of 2.6 kPa, after which the laminate was transferred into an oven while being degassed, and furthermore, held in place for 30 minutes at 90° C. and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of Laminated glass D.

Preparation of Laminated Glass E (for Visible Light Transmittance Measurement):

The interlayer film obtained was cut into a size of 5 cm in longitudinal length×5 cm in transversal length. Next, two sheets of green glass (5 cm in longitudinal length×5 cm in transversal length×2 mm in thickness) in accordance with JIS R3208 were prepared. Between the two sheets of green glass, the interlayer film obtained was sandwiched, held in place for 30 minutes at 90° C. and pressed under vacuum with a vacuum laminator to obtain a laminate. With regard to the laminate, interlayer film portions protruding from the glass plate were cut away to obtain a sheet of Laminated glass E.

Examples 2 to 35 and Comparative Examples 1 to 6

An interlayer film and a sheet of laminated glass were obtained in the same manner as that in Example 1 except that the kind of each of the polyvinyl acetal resin, the plasticizer and the silica particles and the blending amount thereof for the composition for forming a first layer were set to those listed in the following Tables 1 to 5, and the thicknesses of the first layer, the second layer and the third layer were set to those listed in the following Tables 1 to 5. Moreover, in Examples 2 to 35 and Comparative Examples 1 to 6, the ultraviolet ray screening agent and the oxidation inhibitor, both of which were the same kind as those in Example 1, were blended in the same blending amount (0.2 parts by weight relative to 100 parts by weight of the polyvinyl acetal resin) as that in Example 1.

(Evaluation)

(1) Glass Transition Temperature

Immediately after the interlayer film obtained was stored for 12 hours under an environment of a room temperature of 23±2° C. and a humidity of 25±5%, the viscoelasticity thereof was measured by means of a viscoelasticity measuring apparatus "DVA-200" available from IT KEISOKU SEIGYO K.K. A sample of 8 mm in longitudinal width by 5 mm in lateral width was cut out therefrom, and using the shear mode, the measurement was performed under the condition in which the temperature is increased from −30° C. to 100° C. at a temperature increasing rate of 5° C./minute and under the condition of a frequency of 1 Hz and a strain of 0.08%. In the measurement results obtained, the peak temperature of the loss tangent was defined as the glass transition temperature Tg (° C.). The Tg derived from the first layer became lower than the Tg derived from each of the second layer and the third layer.

(2) Tan δ at Glass Transition Temperature

A kneaded product of the composition for forming a first layer was prepared. The kneaded product obtained was press-molded with a press molding machine to obtain a resin film A with a thickness of 0.35 mm. The resin film A obtained was dried under vacuum for 2 hours or longer at 50° C. The viscoelasticity measurement was performed by means of the "Rheometer ARES-G2" available from TA Instruments Japan Inc. With regard to the geometry of a jig for measurement, a parallel plate with a diameter of 8 mm was adopted, and measurement conditions of the temperature: glass transition temperature of the first layer, the strain: 8% and the frequency range: 100 to 0.1 rad/s were adopted to be swept from 100 rad/s. The tan δ value at a frequency of 0.1 rad/s is defined as the "tan δ at glass transition temperature". In this connection, a first layer obtained by stripping off a second layer and a third layer from an interlayer film under the environment of 23° C. may be press-molded at 150° C. so that the thickness becomes 0.35 mm (for 10 minutes at 150° C. in a non-pressurized state and for 10 minutes at 150° C. in a pressurized state) to prepare a resin film A.

(3) Flexural Rigidity

Sheets of Laminated glass A, Laminated glass B, Laminated glass C and Laminated glass F obtained were prepared. In the sheets of Laminated glass A, Laminated glass B, Laminated glass C and Laminated glass F, the following glass plates are used.

Laminated glass A: two glass plates (clear float glass, 25 cm in longitudinal length×10 cm in transversal length×2.5 mm in thickness)

Laminated glass B: one glass plate (clear float glass, 25 cm in longitudinal length×10 cm in transversal length×2.5 mm in thickness) and one glass plate (Gorilla glass 2, 25 cm in longitudinal length×10 cm in transversal length×0.7 mm in thickness)

Laminated glass C: two glass plates (Gorilla glass 2, 25 cm in longitudinal length×10 cm in transversal length×0.7 mm in thickness)

Laminated glass F: one glass plate (clear float glass, 25 cm in longitudinal length×10 cm in transversal length×1.8 mm in thickness) and one glass plate (clear float glass, 25 cm in longitudinal length×10 cm in transversal length×1.0 mm in thickness)

Figure 5:
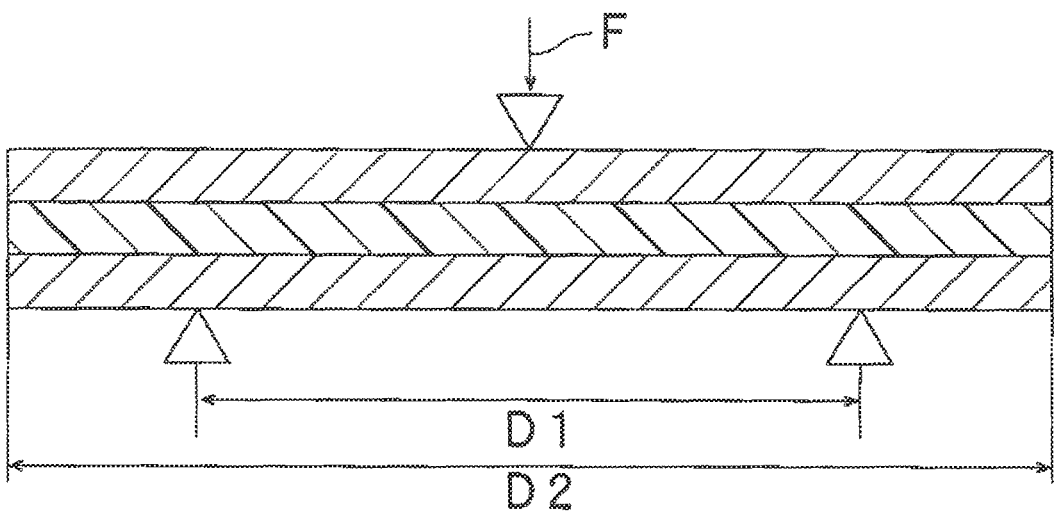
FIG. 5 is a schematic view for illustrating a measurement method for flexural rigidity.

The flexural rigidity was evaluated by the testing method schematically shown in FIG. 5. As a measuring apparatus, the universal testing machine 5966, which is available from INSTRON Japan Co., Ltd. and equipped with the static 3-point flexural test jig 2810, was used. Under measurement conditions of the measurement temperature of 20±3° C., the distance D1 of 18 cm and the distance D2 of 25 cm, a sheet of laminated glass was deformed in the F direction at a displacement rate of 1 mm/minute, and the stress at the time when the deformation amount becomes 1.5 mm was measured to calculate the flexural rigidity.

(4) Sound Insulating Properties

A sheet of laminated glass D was excited by means of a vibration generator for a damping test ("Vibration exciter G21-005D" available from SHINKEN CO., LTD.) to obtain vibration characteristics, the vibration characteristics were amplified by a mechanical impedance measuring apparatus ("XG-81" available from RION Co., Ltd.), and the vibration spectrum was analyzed by an FFT spectrum analyzer ("FFT analyzer HP3582A" available from Yokogawa-Hewlett-Packard Company).

From the ratio of the loss factor thus obtained to the resonance frequency of laminated glass, a graph showing the relationship between the sound frequency (Hz) and the sound transmission loss (dB) at 20° C. was prepared to determine the minimum sound transmission loss (TL value) at a sound frequency of about 2,000 Hz. The higher this TL value is, the higher the sound insulating properties become. The sound insulating properties were judged according to the following criteria.

[Criteria for Judgment in Sound Insulating Properties]

○: The TL value is 35 dB or more.

X: The TL value is less than 35 dB.

(5) Visible Light Transmittance (a Light Y Value, Initial A-Y (380 to 780 nm))

The sheet of Laminated glass E obtained was measured for the visible light transmittance (Visible Transmittance) in the wavelength of 380 to 780 nm in accordance with JIS R3211 (1998) using a spectrophotometer ("U-4100" available from Hitachi High-Technologies Corporation). The visible light transmittance was judged according to the following criteria.

[Criteria for Judgment in Visible Light Transmittance]

○: The visible light transmittance is 70% or more.

X: The visible light transmittance is less than 70%.

The details and the results are shown in the following Tables 1 to 5. In this connection, in the following Tables 1 to 5, the description of ingredients to be blended other than the polyvinyl acetal resin, the plasticizer and the silica particle was omitted.

TABLE 1

|  |  |  |  | Example 1 | Example 2 | Example 3 | Example 4 |
|---|---|---|---|---|---|---|---|
| Composition of first layer | Thickness | | μm | 100 | 100 | 100 | 100 |
| | Polyvinyl acetal resin | Average polymerization degree of PVA | | 1700 | 2500 | 1700 | 1700 |
| | | Content of hydroxyl group | % by mole | 21.2 | 20.8 | 21.2 | 21.2 |
| | | Acetylation degree | % by mole | 12.6 | 23.5 | 12.6 | 12.6 |

TABLE 1-continued

|  |  |  |  |  |  |  |  |
|---|---|---|---|---|---|---|---|
|  |  | Acetalization degree | % by mole | 66.2 | 55.7 | 66.2 | 66.2 |
|  |  | Content | Parts by weight | 100 | 100 | 100 | 100 |
|  | Plasticizer | Kind |  | 3GO | 3GO | 3GO | 3GO |
|  |  | Content | Parts by weight | 60 | 60 | 60 | 60 |
|  | Silica particles | Kind |  | a | a | a | a |
|  |  | Content | Parts by weight | 20 | 20 | 10 | 15 |
|  | Content ratio [silica particles/(polyvinyl acetal resin + plasticizer)] |  |  | 0.13 | 0.13 | 0.06 | 0.09 |
|  | Glass transition temperature |  | °C. | −0.15 | −1.57 | 0.84 | 0.95 |
|  | Tan δ at glass transition temperature |  | — | 1.51 | 1.66 | 1.38 | 1.31 |
| Composition of each of second and third layers | Respective thicknesses |  | μm | 340 | 340 | 340 | 340 |
|  | Polyvinyl acetal resin | Average polymerization degree of PVA |  | 1700 | 1700 | 1700 | 1700 |
|  |  | Content of hydroxyl group | % by mole | 34.5 | 34.5 | 34.5 | 34.5 |
|  |  | Acetylation degree | % by mole | 0.8 | 0.8 | 0.8 | 0.8 |
|  |  | Acetalization degree | % by mole | 64.7 | 64.7 | 64.7 | 64.7 |
|  |  | Content | Parts by weight | 100 | 100 | 100 | 100 |
|  | Plasticizer | Kind |  | 3GO | 3GO | 3GO | 3GO |
|  |  | Content | Parts by weight | 24 | 24 | 24 | 24 |
| Evaluation | Flexural rigidity | Laminated glass A | mm/N | 0.0034 | 0.0035 | 0.0044 | 0.0041 |
|  |  | Laminated glass B | mm/N | 0.0074 | 0.0073 | 0.0090 | 0.0085 |
|  |  | Laminated glass C | mm/N | 0.0465 | 0.0458 | 0.0664 | 0.0600 |
|  |  | Laminated glass F | mm/N | 0.0110 | 0.0109 | 0.0142 | 0.0131 |
|  | Sound insulation properties: TL method |  |  | ○ | ○ | ○ | ○ |
|  | Visible light transmittance |  |  | ○ | ○ | ○ | ○ |

|  |  |  |  | Example 5 | Example 6 | Example 7 | Example 8 |
|---|---|---|---|---|---|---|---|
| Composition of first layer | Thickness |  | μm | 100 | 100 | 100 | 100 |
|  | Polyvinyl acetal resin | Average polymerization degree of PVA |  | 1700 | 1700 | 1700 | 3000 |
|  |  | Content of hydroxyl group | % by mole | 21.2 | 21.2 | 21.2 | 23.3 |
|  |  | Acetylation degree | % by mole | 12.6 | 12.6 | 12.6 | 12.0 |
|  |  | Acetalization degree | % by mole | 66.2 | 66.2 | 66.2 | 64.7 |
|  |  | Content | Parts by weight | 100 | 100 | 100 | 100 |
|  | Plasticizer | Kind |  | 3GO | 3GO | 3GO | 3GO |
|  |  | Content | Parts by weight | 60 | 60 | 60 | 60 |
|  | Silica particles | Kind |  | a | a | b | a |
|  |  | Content | Parts by weight | 60 | 5 | 20 | 5 |
|  | Content ratio [silica particles/(polyvinyl acetal resin + plasticizer)] |  |  | 0.38 | 0.03 | 0.13 | 0.03 |
|  | Glass transition temperature |  | °C. | 2.42 | 0.25 | −0.25 | 2.11 |
|  | Tan δ at glass transition temperature |  | — | 0.71 | 1.44 | 1.55 | 1.49 |
| Composition of each of second and third layers | Respective thicknesses |  | μm | 340 | 340 | 340 | 340 |
|  | Polyvinyl acetal resin | Average polymerization degree of PVA |  | 1700 | 1700 | 1700 | 1700 |
|  |  | Content of hydroxyl group | % by mole | 34.5 | 34.5 | 34.5 | 30.1 |
|  |  | Acetylation degree | % by mole | 0.8 | 0.8 | 0.8 | 0.8 |
|  |  | Acetalization degree | % by mole | 64.7 | 64.7 | 64.7 | 69.1 |
|  |  | Content | Parts by weight | 100 | 100 | 100 | 100 |
|  | Plasticizer | Kind |  | 3GO | 3GO | 3GO | 3GO |
|  |  | Content | Parts by weight | 24 | 24 | 24 | 38.5 |
| Evaluation | Flexural rigidity | Laminated glass A | mm/N | 0.0025 | 0.0045 | 0.0043 | 0.0058 |
|  |  | Laminated glass B | mm/N | 0.0058 | 0.0092 | 0.0080 | 0.0109 |
|  |  | Laminated glass C | mm/N | 0.0312 | 0.0681 | 0.0532 | 0.0895 |
|  |  | Laminated glass F | mm/N | 0.0085 | 0.0144 | 0.0120 | 0.0179 |
|  | Sound insulation properties: TL method |  |  | ○ | ○ | ○ | ○ |
|  | Visible light transmittance |  |  | ○ | ○ | ○ | ○ |

TABLE 2

|  |  |  |  | Comparative Example 1 | Comparative Example 2 | Comparative Example 3 | Comparative Example 4 |
|---|---|---|---|---|---|---|---|
| Composition of first layer | Thickness |  | μm | 100 | 100 | 100 | 100 |
|  | Polyvinyl acetal resin | Average polymerization degree of PVA |  | 1700 | 2300 | 3000 | 1700 |
|  |  | Content of hydroxyl group | % by mole | 23.1 | 23.0 | 23.3 | 21.2 |
|  |  | Acetylation degree | % by mole | 11.8 | 11.5 | 12.0 | 12.6 |
|  |  | Acetalization degree | % by mole | 65.1 | 65.5 | 64.7 | 66.2 |
|  |  | Content | Parts by weight | 100 | 100 | 100 | 100 |
|  | Plasticizer | Kind |  | 3GO | 3GO | 3GO | 3GO |
|  |  | Content | Parts by weight | 60 | 60 | 60 | 60 |
|  | Silica particles | Kind |  | — | — | — | a |
|  |  | Content | Parts by weight | — | — | — | 3 |
|  | Content ratio [silica particles/(polyvinyl acetal resin + plasticizer)] |  |  | — | — | — | 0.02 |
|  | Glass transition temperature |  | °C. | 2.21 | 2.16 | 2.06 | 0.21 |
|  | Tan δ at glass transition temperature |  | — | 1.486 | 1.482 | 1.493 | 1.45 |
| Composition of each of second and third layers | Respective thickness |  | μm | 340 | 340 | 340 | 340 |
|  | Polyvinyl acetal resin | Average polymerization degree of PVA |  | 1700 | 1700 | 1700 | 1700 |
|  |  | Content of hydroxyl group | % by mole | 30.1 | 30.1 | 30.1 | 30.1 |
|  |  | Acetylation degree | % by mole | 0.8 | 0.8 | 0.8 | 0.8 |
|  |  | Acetalization degree | % by mole | 69.1 | 69.1 | 69.1 | 69.1 |
|  |  | Content | Parts by weight | 100 | 100 | 100 | 100 |
|  | Plasticizer | Kind |  | 3GO | 3GO | 3GO | 3GO |
|  |  | Content | Parts by weight | 38.5 | 38.5 | 38.5 | 38.5 |
| Evaluation | Flexural rigidity | Laminated glass A | mm/N | 0.0062 | 0.0061 | 0.0063 | 0.0059 |
|  |  | Laminated glass B | mm/N | 0.0113 | 0.0115 | 0.0111 | 0.0099 |
|  |  | Laminated glass C | mm/N | 0.1065 | 0.1066 | 0.1060 | 0.1043 |
|  |  | Laminated glass F | mm/N | 0.0206 | 0.0206 | 0.0205 | 0.0197 |
|  | Sound insulation properties: TL method |  |  | ○ | ○ | ○ | ○ |
|  | Visible light transmittance |  |  | ○ | ○ | ○ | ○ |

|  |  |  |  | Comparative Example 5 | Comparative Example 6 | Example 9 | Example 10 |
|---|---|---|---|---|---|---|---|
| Composition of first layer | Thickness |  | μm | 100 | 100 | 60 | 60 |
|  | Polyvinyl acetal resin | Average polymerization degree of PVA |  | 1700 | 1700 | 1700 | 2500 |
|  |  | Content of hydroxyl group | % by mole | 21.2 | 21.2 | 21.2 | 20.8 |
|  |  | Acetylation degree | % by mole | 12.6 | 12.6 | 12.6 | 23.5 |
|  |  | Acetalization degree | % by mole | 66.2 | 66.2 | 66.2 | 55.7 |
|  |  | Content | Parts by weight | 100 | 100 | 100 | 100 |
|  | Plasticizer | Kind |  | 3GO | 3GO | 3GO | 3GO |
|  |  | Content | Parts by weight | 60 | 60 | 60 | 60 |
|  | Silica particles | Kind |  | a | a | a | a |
|  |  | Content | Parts by weight | 70 | 80 | 20 | 20 |
|  | Content ratio [silica particles/(polyvinyl acetal resin + plasticizer)] |  |  | 0.44 | 0.50 | 0.13 | 0.13 |
|  | Glass transition temperature |  | °C. | 5.81 | 5.95 | −0.18 | −1.52 |
|  | Tan δ at glass transition temperature |  | — | 0.57 | 0.44 | 1.54 | 1.64 |
| Composition of each of second and third layers | Respective thickness |  | μm | 340 | 340 | 360 | 360 |
|  | Polyvinyl acetal resin | Average polymerization degree of PVA |  | 1700 | 1700 | 1700 | 1700 |
|  |  | Content of hydroxyl group | % by mole | 34.5 | 34.5 | 34.5 | 34.5 |
|  |  | Acetylation degree | % by mole | 0.8 | 0.8 | 0.8 | 0.8 |
|  |  | Acetalization degree | % by mole | 64.7 | 64.7 | 64.7 | 64.7 |
|  |  | Content | Parts by weight | 100 | 100 | 100 | 100 |
|  | Plasticizer | Kind |  | 3GO | 3GO | 3GO | 3GO |
|  |  | Content | Parts by weight | 24 | 24 | 24 | 24 |
| Evaluation | Flexural rigidity | Laminated glass A | mm/N | 0.0020 | 0.0011 | 0.0033 | 0.0031 |
|  |  | Laminated glass B | mm/N | 0.0050 | 0.0031 | 0.0063 | 0.0064 |
|  |  | Laminated glass C | mm/N | 0.0241 | 0.0108 | 0.0353 | 0.0352 |
|  |  | Laminated glass F | mm/N | 0.0074 | 0.0052 | 0.0092 | 0.0091 |
|  | Sound insulation properties: TL method |  |  | X | X | ○ | ○ |
|  | Visible light transmittance |  |  | ○ | ○ | ○ | ○ |

TABLE 3

|  |  |  |  | Example 11 | Example 12 | Example 13 | Example 14 |
|---|---|---|---|---|---|---|---|
| Composition of first layer | Thickness |  | μm | 100 | 100 | 100 | 100 |
|  | Polyvinyl acetal resin | Average polymerization degree of PVA |  | 1700 | 1700 | 1700 | 1700 |
|  |  | Content of hydroxyl group | % by mole | 23.1 | 23.1 | 23.1 | 23.1 |
|  |  | Acetylation degree | % by mole | 12.5 | 12.5 | 12.5 | 12.5 |
|  |  | Acetalization degree | % by mole | 64.5 | 64.5 | 64.5 | 64.5 |
|  |  | Content | Parts by weight | 100 | 100 | 100 | 100 |
|  | Plasticizer | Kind |  | 3GO | 3GO | 3GO | 3GO |
|  |  | Content | Parts by weight | 60 | 60 | 60 | 60 |
|  | Silica particles | Kind |  | c | c | c | c |
|  |  | Content | Parts by weight | 20 | 20 | 20 | 20 |
|  | Content ratio [silica particles/(polyvinyl acetal resin + plasticizer)] |  |  | 0.13 | 0.13 | 0.13 | 0.13 |
|  | Glass transition temperature |  | °C. | 2.13 | 2.13 | 2.13 | 2.13 |
|  | Tan δ at glass transition temperature |  | — | 1.22 | 1.22 | 1.22 | 1.22 |
| Composition of each of second and third layers | Respective thickness |  | μm | 340 | 340 | 340 | 340 |
|  | Polyvinyl acetal resin | Average polymerization degree of PVA |  | 1700 | 1700 | 1700 | 1700 |
|  |  | Content of hydroxyl group | % by mole | 34.5 | 33.2 | 32.5 | 31.4 |
|  |  | Acetylation degree | % by mole | 0.8 | 0.8 | 0.8 | 0.8 |
|  |  | Acetalization degree | % by mole | 64.7 | 66 | 66.7 | 67.8 |
|  |  | Content | Parts by weight | 100 | 100 | 100 | 100 |
|  | Plasticizer | Kind |  | 3GO | 3GO | 3GO | 3GO |
|  |  | Content | Parts by weight | 22 | 34.1 | 35.3 | 37.3 |
| Evaluation | Flexural rigidity | Laminated glass A | mm/N | 0.0044 | 0.0044 | 0.0045 | 0.0047 |
|  |  | Laminated glass B | mm/N | 0.0086 | 0.0085 | 0.0087 | 0.0091 |
|  |  | Laminated glass C | mm/N | 0.0648 | 0.0613 | 0.0640 | 0.0702 |
|  |  | Laminated glass F | mm/N | 0.0139 | 0.0135 | 0.0140 | 0.0150 |
|  | Sound insulation properties: TL method |  |  | ◯ | ◯ | ◯ | ◯ |
|  | Visible light transmittance |  |  | ◯ | ◯ | ◯ | ◯ |

|  |  |  |  | Example 15 | Example 16 | Example 17 | Example 18 |
|---|---|---|---|---|---|---|---|
| Composition of first layer | Thickness |  | μm | 100 | 100 | 100 | 100 |
|  | Polyvinyl acetal resin | Average polymerization degree of PVA |  | 1700 | 1700 | 1700 | 1700 |
|  |  | Content of hydroxyl group | % by mole | 23.1 | 23.1 | 23.1 | 23.1 |
|  |  | Acetylation degree | % by mole | 12.5 | 12.5 | 12.5 | 12.5 |
|  |  | Acetalization degree | % by mole | 64.5 | 64.5 | 64.5 | 64.5 |
|  |  | Content | Parts by weight | 100 | 100 | 100 | 100 |
|  | Plasticizer | Kind |  | 3GO | 3GO | 3GO | 3GO |
|  |  | Content | Parts by weight | 60 | 60 | 60 | 60 |
|  | Silica particles | Kind |  | c | c | c | c |
|  |  | Content | Parts by weight | 20 | 20 | 20 | 20 |
|  | Content ratio [silica particles/(polyvinyl acetal resin + plasticizer)] |  |  | 0.13 | 0.13 | 0.13 | 0.13 |
|  | Glass transition temperature |  | °C. | −0.12 | 2.13 | 2.13 | 2.13 |
|  | Tan δ at glass transition temperature |  | — | 1.29 | 1.22 | 1.22 | 1.22 |
| Composition of each of second and third layers | Respective thickness |  | μm | 340 | 340 | 340 | 340 |
|  | Polyvinyl acetal resin | Average polymerization degree of PVA |  | 1700 | 1700 | 1700 | 1700 |
|  |  | Content of hydroxyl group | % by mole | 34.5 | 35.4 | 36.5 | 37.3 |
|  |  | Acetylation degree | % by mole | 0.8 | 0.8 | 0.8 | 0.8 |
|  |  | Acetalization degree | % by mole | 64.7 | 63.8 | 62.7 | 61.9 |
|  |  | Content | Parts by weight | 100 | 100 | 100 | 100 |
|  | Plasticizer | Kind |  | 3GO | 3GO | 3GO | 3GO |
|  |  | Content | Parts by weight | 28.6 | 30.2 | 28.3 | 26.8 |

TABLE 3-continued

| Evaluation | Flexural rigidity | Laminated glass A | mm/N | 0.0038 | 0.0041 | 0.0041 | 0.0040 |
|---|---|---|---|---|---|---|---|
| | | Laminated glass B | mm/N | 0.0077 | 0.0081 | 0.0081 | 0.0080 |
| | | Laminated glass C | mm/N | 0.0512 | 0.0570 | 0.0560 | 0.0556 |
| | | Laminated glass F | mm/N | 0.0118 | 0.0128 | 0.0127 | 0.0126 |
| | Sound insulation properties: TL method | | | ○ | ○ | ○ | ○ |
| | Visible light transmittance | | | ○ | ○ | ○ | ○ |

TABLE 4

| | | | | Example 19 | Example 20 | Example 21 | Example 22 |
|---|---|---|---|---|---|---|---|
| Composition of first layer | Thickness | | μm | 100 | 100 | 100 | 100 |
| | Polyvinyl acetal resin | Average polymerization degree of PVA | | 1700 | 1700 | 1700 | 2300 |
| | | Content of hydroxyl group | % by mole | 21.1 | 20.8 | 24.4 | 24.6 |
| | | Acetylation degree | % by mole | 1.6 | 1.6 | 6.5 | 6.5 |
| | | Acetalization degree | % by mole | 77.3 | 77.6 | 69.1 | 68.9 |
| | | Content | Parts by weight | 100 | 100 | 100 | 100 |
| | Plasticizer | Kind | | 3GO | 3GO | 3GO | 3GO |
| | | Content | Parts by weight | 60 | 60 | 60 | 60 |
| | Silica particles | Kind | | c | c | c | c |
| | | Content | Parts by weight | 20 | 20 | 20 | 20 |
| | Content ratio [silica particles/(polyvinyl acetal resin + plasticizer)] | | | 0.13 | 0.13 | 0.13 | 0.13 |
| | Glass transition temperature | | °C. | 3.87 | 3.74 | 5.42 | 5.54 |
| | Tan δ at glass transition temperature | | — | 1.17 | 1.19 | 1.14 | 1.16 |
| Composition of each of second and third layers | Respective thicknesses | | μm | 340 | 340 | 340 | 340 |
| | Polyvinyl acetal resin | Average polymerization degree of PVA | | 1700 | 1700 | 1700 | 1700 |
| | | Content of hydroxyl group | % by mole | 34.5 | 34.5 | 34.5 | 34.5 |
| | | Acetylation degree | % by mole | 0.8 | 0.8 | 0.8 | 0.8 |
| | | Acetalization degree | % by mole | 64.7 | 64.7 | 64.7 | 64.7 |
| | | Content | Parts by weight | 100 | 100 | 100 | 100 |
| | Plasticizer | Kind | | 3GO | 3GO | 3GO | 3GO |
| | | Content | Parts by weight | 31 | 31 | 36 | 36 |
| Evaluation | Flexural rigidity | Laminated glass A | mm/N | 0.0040 | 0.0039 | 0.0040 | 0.0041 |
| | | Laminated glass B | mm/N | 0.0079 | 0.0079 | 0.0080 | 0.0081 |
| | | Laminated glass C | mm/N | 0.0544 | 0.0537 | 0.0547 | 0.0569 |
| | | Laminated glass F | mm/N | 0.0124 | 0.0123 | 0.0124 | 0.0128 |
| | Sound insulation properties: TL method | | | ○ | ○ | ○ | ○ |
| | Visible light transmittance | | | ○ | ○ | ○ | ○ |

| | | | | Example 23 | Example 24 | Example 25 | Example 26 |
|---|---|---|---|---|---|---|---|
| Composition of first layer | Thickness | | μm | 100 | 100 | 80 | 50 |
| | Polyvinyl acetal resin | Average polymerization degree of PVA | | 1700 | 1700 | 1700 | 1700 |
| | | Content of hydroxyl group | % by mole | 23.1 | 23.1 | 23.1 | 23.1 |
| | | Acetylation degree | % by mole | 12.5 | 12.5 | 12.5 | 12.5 |
| | | Acetalization degree | % by mole | 64.5 | 64.5 | 64.5 | 64.5 |
| | | Content | Parts by weight | 100 | 100 | 100 | 100 |
| | Plasticizer | Kind | | 3GO | 3GO | 3GO | 3GO |
| | | Content | Parts by weight | 50 | 80 | 60 | 60 |
| | Silica particles | Kind | | c | c | c | c |
| | | Content | Parts by weight | 20 | 20 | 20 | 20 |
| | Content ratio [silica particles/(polyvinyl acetal resin + plasticizer)] | | | 0.13 | 0.11 | 0.13 | 0.13 |
| | Glass transition temperature | | °C. | 6.04 | −5.32 | 2.13 | 2.13 |
| | Tan δ at glass transition temperature | | — | 1.31 | 1.03 | 1.22 | 1.22 |
| Composition of each of second and third layers | Respective thicknesses | | μm | 340 | 340 | 350 | 345 |
| | Polyvinyl acetal resin | Average polymerization degree of PVA | | 1700 | 1700 | 1700 | 1700 |
| | | Content of hydroxyl group | % by mole | 34.5 | 34.5 | 34.5 | 34.5 |

TABLE 4-continued

|  |  |  |  |  |  |  |  |
|---|---|---|---|---|---|---|---|
|  |  | Acetylation degree | % by mole | 0.8 | 0.8 | 0.8 | 0.8 |
|  |  | Acetalization degree | % by mole | 64.7 | 64.7 | 64.7 | 64.7 |
|  |  | Content | Parts by weight | 100 | 100 | 100 | 100 |
|  | Plasticizer | Kind |  | 3GO | 3GO | 3GO | 3GO |
|  |  | Content | Parts by weight | 33 | 30 | 32 | 32 |
| Evaluation | Flexural rigidity | Laminated glass A | mm/N | 0.0035 | 0.0048 | 0.0042 | 0.0038 |
|  |  | Laminated glass B | mm/N | 0.0073 | 0.0092 | 0.0083 | 0.0076 |
|  |  | Laminated glass C | mm/N | 0.0458 | 0.0731 | 0.0604 | 0.0511 |
|  |  | Laminated glass F | mm/N | 0.0109 | 0.0152 | 0.0132 | 0.0117 |
|  | Sound insulation properties: TL method |  |  | ○ | ○ | ○ | ○ |
|  | Visible light transmittance |  |  | ○ | ○ | ○ | ○ |

TABLE 5

|  |  |  |  | Example 27 | Example 28 | Example 29 | Example 30 | Example 31 |
|---|---|---|---|---|---|---|---|---|
| Composition of first layer | Thickness |  | μm | 120 | 120 | 120 | 70 | 100 |
|  | Polyvinyl acetal resin | Average polymerization degree of PVA |  | 1700 | 1700 | 1700 | 1700 | 1700 |
|  |  | Content of hydroxyl group | % by mole | 24.6 | 24.6 | 24.6 | 23.4 | 23.1 |
|  |  | Acetylation degree | % by mole | 14 | 14 | 14 | 13.3 | 12.5 |
|  |  | Acetalization degree | % by mole | 61.4 | 61.4 | 61.4 | 63.3 | 64.5 |
|  |  | Content | Parts by weight | 100 | 100 | 100 | 100 | 100 |
|  | Plasticizer | Kind |  | 3GO | 3GO | 3GO | 3GO | 3GO |
|  |  | Content | Parts by weight | 60 | 60 | 60 | 60 | 60 |
|  | Silica particles | Kind |  | d | d | d | d | c |
|  |  | Content | Parts by weight | 20 | 20 | 20 | 20 | 30 |
|  | Content ratio [silica particles/(polyvinyl acetal resin + plasticizer)] |  |  | 0.13 | 0.13 | 0.13 | 0.13 | 0.19 |
|  | Glass transition temperature |  | ° C. | 3.42 | 3.42 | 3.42 | 2.03 | 2.36 |
|  | Tan δ at glass transition temperature |  | — | 1.16 | 1.16 | 1.16 | 1.21 | 1.08 |
| Composition of each of second and third layers | Respective thickness |  | μm | 330 | 330 | 330 | 355 | 340 |
|  | Polyvinyl acetal resin | Average polymerization degree of PVA |  | 1700 | 1700 | 1700 | 1700 | 1700 |
|  |  | Content of hydroxyl group | % by mole | 34.5 | 34.5 | 34.5 | 34.5 | 34.5 |
|  |  | Acetylation degree | % by mole | 0.8 | 0.8 | 0.8 | 0.8 | 0.8 |
|  |  | Acetalization degree | % by mole | 64.7 | 64.7 | 64.7 | 64.7 | 64.7 |
|  |  | Content | Parts by weight | 100 | 100 | 100 | 100 | 100 |
|  | Plasticizer | Kind |  | 3GO | 3GO | 3GO | 3GO | 3GO |
|  |  | Content | Parts by weight | 31 | 33 | 35 | 32 | 32 |
| Evaluation | Flexural rigidity | Laminated glass A | mm/N | 0.0039 | 0.0043 | 0.0044 | 0.0037 | 0.0035 |
|  |  | Laminated glass B | mm/N | 0.0081 | 0.0084 | 0.0087 | 0.0075 | 0.0082 |
|  |  | Laminated glass C | mm/N | 0.0579 | 0.0617 | 0.0667 | 0.0486 | 0.0575 |
|  |  | Laminated glass F | mm/N | 0.0128 | 0.0134 | 0.0142 | 0.0113 | 0.0128 |
|  | Sound insulation properties: TL method |  |  | ○ | ○ | ○ | ○ | ○ |
|  | Visible light transmittance |  |  | ○ | ○ | ○ | ○ | ○ |

|  |  |  |  | Example 32 | Example 33 | Example 34 | Example 35 |
|---|---|---|---|---|---|---|---|
| Composition of first layer | Thickness |  | μm | 100 | 100 | 100 | 100 |
|  | Polyvinyl acetal resin | Average polymerization degree of PVA |  | 1700 | 1700 | 1700 | 1700 |
|  |  | Content of hydroxyl group | % by mole | 23.1 | 23.1 | 23.1 | 27.5 |
|  |  | Acetylation degree | % by mole | 12.5 | 12.5 | 12.5 | 12.5 |
|  |  | Acetalization degree | % by mole | 64.5 | 64.5 | 64.5 | 60 |
|  |  | Content | Parts by weight | 100 | 100 | 100 | 100 |
|  | Plasticizer | Kind |  | 3GO | 3GO | 3GO | DBEA |
|  |  | Content | Parts by weight | 60 | 60 | 60 | 60 |
|  | Silica particles | Kind |  | c | c | c | c |
|  |  | Content | Parts by weight | 40 | 50 | 60 | 20 |
|  | Content ratio [silica particles/(polyvinyl acetal resin + plasticizer)] |  |  | 0.25 | 0.31 | 0.38 | 0.13 |

TABLE 5-continued

| | | | | | | | |
|---|---|---|---|---|---|---|---|
| | Glass transition temperature | | ° C. | 2.58 | 2.75 | 2.77 | 0.34 |
| | Tan δ at glass transition temperature | | — | 0.95 | 0.82 | 0.68 | 1.19 |
| Composition of each of second and third layers | Respective thickness | | μm | 340 | 340 | 340 | 340 |
| | Polyvinyl acetal resin | Average polymerization degree of PVA | | 1700 | 1700 | 1700 | 1700 |
| | | Content of hydroxyl group | % by mole | 34.5 | 34.5 | 34.5 | 34.5 |
| | | Acetylation degree | % by mole | 0.8 | 0.8 | 0.8 | 0.8 |
| | | Acetalization degree | % by mole | 64.7 | 64.7 | 64.7 | 64.7 |
| | | Content | Parts by weight | 100 | 100 | 100 | 100 |
| | Plasticizer | Kind | | 3GO | 3GO | 3GO | DBEA |
| | | Content | Parts by weight | 32 | 32 | 32 | 38.5 |
| Evaluation | Flexural rigidity | Laminated glass A | mm/N | 0.0031 | 0.0027 | 0.0025 | 0.0046 |
| | | Laminated glass B | mm/N | 0.0076 | 0.0070 | 0.0063 | 0.0089 |
| | | Laminated glass C | mm/N | 0.0508 | 0.0451 | 0.0408 | 0.0677 |
| | | Laminated glass F | mm/N | 0.0117 | 0.0108 | 0.0101 | 0.0146 |
| | Sound insulation properties: TL method | | | ○ | ○ | ○ | ○ |
| | Visible light transmittance | | | ○ | ○ | ○ | ○ |

EXPLANATION OF SYMBOLS

1: First layer
1a: First surface
1b: Second surface
2: Second layer
2a: Outer surface
3: Third layer
3a: Outer surface
11: Interlayer film
11A: Interlayer film (first layer)
11a: First surface
11b: Second surface
21: First laminated glass member
22: Second laminated glass member
31: Laminated glass
31A: Laminated glass Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An interlayer film for laminated glass having a one-layer structure or a two or more-layer structure, the interlayer film comprising:
   a first layer containing a polyvinyl acetal resin and a plasticizer, wherein
   an acetylation degree of the polyvinyl acetal resin in the first layer is 7% by mole or more, the first layer further contains silica particles,
   the ratio of a content of the silica particles in the first layer to a total content of the polyvinyl acetal resin and the plasticizer in the first layer is from 0.11 to 0.4, and
   a glass transition temperature of the first layer is 5° C. or less.

2. The interlayer film for laminated glass according to claim 1,
   wherein the content of the silica particles in the first layer is from 5 parts by weight to 64 parts by weight relative to 100 parts by weight of the polyvinyl acetal resin in the first layer.

3. The interlayer film for laminated glass according to claim 1, further comprising a second layer containing a polyvinyl acetal resin and a plasticizer,
   wherein the second layer is arranged on a first surface side of the first layer.

4. The interlayer film for laminated glass according to claim 3,
   wherein the glass transition temperature of the first layer is lower than a glass transition temperature of the second layer.

5. The interlayer film for laminated glass according to claim 3,
   wherein a content of hydroxyl group of the polyvinyl acetal resin in the first layer is lower than a content of hydroxyl group of the polyvinyl acetal resin in the second layer.

6. The interlayer film for laminated glass according to claim 3,
   wherein a content of the plasticizer in the first layer relative to 100 parts by weight of the polyvinyl acetal resin in the first layer is greater than a content of the plasticizer in the second layer relative to 100 parts by weight of the polyvinyl acetal resin in the second layer.

7. The interlayer film for laminated glass according to claim 3,
   wherein a content of hydroxyl group of the polyvinyl acetal resin in the second layer is 32% by mole or more.

8. The interlayer film for laminated glass according to claim 3,
   wherein a content of the plasticizer in the second layer is 35 parts by weight or less relative to 100 parts by weight of the polyvinyl acetal resin in the second layer.

9. The interlayer film for laminated glass according to claim 3, further comprising a third layer containing a polyvinyl acetal resin and a plasticizer,
   wherein the third layer is arranged on a second surface side opposite to the first surface of the first layer.

10. The interlayer film for laminated glass according to claim 3,
    wherein a thickness of the first layer is 0.4T or less, wherein T is a thickness of the interlayer film for laminated glass.

11. The interlayer film for laminated glass according to claim 1,
    wherein, when a sheet of laminated glass is obtained by sandwiching the interlayer film for laminated glass between two sheets of green glass with a thickness of 2 mm in accordance with JIS R3208, a visible light transmittance of the sheet of laminated glass is 70% or more.

12. The interlayer film for laminated glass according to claim 1, wherein the interlayer film is used together with a first glass plate having a thickness of 1 mm or less, and is arranged between the first glass plate and a second glass plate for obtaining a sheet of laminated glass.

13. The interlayer film for laminated glass according to claim 1, wherein the ratio of the content of the silica particles in the first layer to the total content of the polyvinyl acetal resin and the plasticizer in the first layer is from 0.12 to 0.4.

14. A laminated glass, comprising:
a first laminated glass member;
a second laminated glass member; and
the interlayer film for laminated glass according to claim 1,
wherein the interlayer film for laminated glass is arranged between the first laminated glass member and the second laminated glass member.

15. The laminated glass according to claim 14, wherein the first laminated glass member is a first glass plate and a thickness of the first glass plate is 1 mm or less.

* * * * *